United States Patent
Fan et al.

(10) Patent No.: US 10,549,236 B2
(45) Date of Patent: Feb. 4, 2020

(54) SYSTEMS, METHODS AND MATERIALS FOR NOX DECOMPOSITION WITH METAL OXIDE MATERIALS

(71) Applicant: OHIO STATE INNOVATION FOUNDATION, Columbus, OH (US)

(72) Inventors: Liang-Shih Fan, Columbus, OH (US); Deven Swapneshu Baser, Columbus, OH (US); Peter Sandvik, Columbus, OH (US); Mandar Kathe, Columbus, OH (US); Charles Fryer, Columbus, OH (US)

(73) Assignee: OHIO STATE INNOVATION FOUNDATION, Columbus, OH (US)

( * ) Notice: Subject to any disclaimer, the term of this patent is extended or adjusted under 35 U.S.C. 154(b) by 0 days.

(21) Appl. No.: 16/260,447

(22) Filed: Jan. 29, 2019

(65) Prior Publication Data

US 2019/0232220 A1 Aug. 1, 2019

Related U.S. Application Data

(60) Provisional application No. 62/623,355, filed on Jan. 29, 2018.

(51) Int. Cl.
*B01D 53/86* (2006.01)
*B01D 53/90* (2006.01)
(Continued)

(52) U.S. Cl.
CPC ....... *B01D 53/8628* (2013.01); *B01D 53/869* (2013.01); *B01D 53/8696* (2013.01);
(Continued)

(58) Field of Classification Search
CPC .............. B01D 53/56; B01D 53/565; B01D 2251/602; B01D 2253/1124;
(Continued)

(56) References Cited

U.S. PATENT DOCUMENTS

| 971,206 A | 9/1910 | Messerschmitt |
|---|---|---|
| 1,078,686 A | 11/1913 | Lane |

(Continued)

FOREIGN PATENT DOCUMENTS

| CN | 1329761 | 1/2001 |
|---|---|---|
| CN | 1454711 | 11/2003 |

(Continued)

OTHER PUBLICATIONS

Abdallah et al., "Comparison of mesoporous silicate supports for the immobilisation and activity of cytochrome c and lipase," J. Mol. Catal. B: Enzym., 2014, 108, 82-88.

(Continued)

*Primary Examiner* — Timothy C Vanoy
(74) *Attorney, Agent, or Firm* — Michael Best & Friedrich LLP

(57) ABSTRACT

Systems and methods use oxygen uncoupling metal oxide material for decomposition of $NO_x$. A gaseous input stream comprising $NO_x$ is contacted with a metal oxide particle, generating nitrogen ($N_2$) gas and an oxidized metal oxide particle. After contacting the first gaseous input stream with the metal oxide particle, a first gaseous product stream is collected. The first gaseous product stream includes substantially no $NO_x$. A second gaseous input stream comprising at least one sweeping gas is also contacted with the oxidized metal oxide particle. After contacting the oxidized metal oxide particle, the sweeping gas includes oxygen ($O_2$) and a reduced metal oxide particle is generated. Then a second gaseous product stream is collected, where the second gaseous product stream includes oxygen ($O_2$) gas.

7 Claims, 10 Drawing Sheets

(51) Int. Cl.
    *B01J 35/02* (2006.01)
    *B01J 37/14* (2006.01)
(52) U.S. Cl.
    CPC .............. *B01D 53/90* (2013.01); *B01J 35/02* (2013.01); *B01J 37/14* (2013.01); *B01D 2251/102* (2013.01); *B01D 2255/40* (2013.01); *B01D 2257/404* (2013.01); *B01D 2258/0291* (2013.01)
(58) Field of Classification Search
    CPC .......... B01D 2255/40; B01D 2257/402; B01D 2257/404; B01D 2258/0283; B01J 8/00; B01J 19/00; B01J 20/06; B01J 23/00; B01J 2208/00; B01J 2219/00; B01J 2219/0875
    See application file for complete search history.

(56) References Cited

U.S. PATENT DOCUMENTS

| | | |
|---|---|---|
| 1,658,939 A | 2/1928 | Parsons |
| 2,182,747 A | 12/1939 | Marshall, Jr. |
| 2,198,560 A | 4/1940 | Marshall, Jr. |
| 2,449,635 A | 9/1948 | Barr |
| 2,614,067 A | 10/1952 | Reed et al. |
| 2,635,947 A | 4/1953 | Reed et al. |
| 2,686,819 A | 8/1954 | Johnson |
| 2,694,622 A | 11/1954 | Reed et al. |
| 2,697,686 A | 12/1954 | Lefler |
| 2,899,374 A | 8/1959 | Gomory |
| 2,979,384 A | 4/1961 | Weiner et al. |
| 3,027,238 A | 3/1962 | Watkins |
| 3,031,287 A | 4/1962 | Benson et al. |
| 3,338,667 A | 8/1967 | Pundsack |
| 3,353,925 A | 11/1967 | Baumann et al. |
| 3,382,033 A * | 5/1968 | Kitagawa ............... B01D 53/56 423/239.1 |
| 3,421,869 A | 1/1969 | Benson |
| 3,442,613 A | 5/1969 | Grotz, Jr. |
| 3,442,619 A | 5/1969 | Huebler et al. |
| 3,442,620 A | 5/1969 | Huebler et al. |
| 3,494,858 A | 2/1970 | Luckenbach |
| 3,523,821 A | 8/1970 | Bryce et al. |
| 3,573,224 A | 3/1971 | Strelzoff et al. |
| 3,619,142 A | 11/1971 | Johnson et al. |
| 3,726,966 A | 4/1973 | Johnston |
| 3,962,409 A | 6/1976 | Kotera et al. |
| 4,017,270 A | 4/1977 | Funk et al. |
| 4,057,402 A | 11/1977 | Patel et al. |
| 4,075,079 A | 2/1978 | Lang |
| 4,108,732 A | 8/1978 | Nuttall, Jr. |
| 4,151,124 A * | 4/1979 | Gidaspow ............... B01D 53/02 423/213.5 |
| 4,155,832 A | 5/1979 | Cox et al. |
| 4,272,399 A | 6/1981 | Davis et al. |
| 4,318,711 A | 3/1982 | Smith |
| 4,325,833 A | 4/1982 | Scott |
| 4,334,959 A | 6/1982 | Green |
| 4,343,624 A | 8/1982 | Belke et al. |
| 4,348,487 A | 9/1982 | Goldstein et al. |
| 4,404,086 A | 9/1983 | Oltrogge |
| 4,420,332 A | 12/1983 | Mori et al. |
| 4,439,412 A | 3/1984 | Behie et al. |
| 4,521,117 A | 6/1985 | Ouwerkerk et al. |
| 4,594,140 A | 6/1986 | Cheng |
| 4,778,585 A | 10/1988 | Graff |
| 4,842,777 A | 6/1989 | Lamort |
| 4,861,165 A | 8/1989 | Fredriksson et al. |
| 4,869,207 A | 9/1989 | Engstrom et al. |
| 4,895,821 A | 1/1990 | Kainer et al. |
| 4,902,586 A | 2/1990 | Wertheim |
| 5,130,106 A | 7/1992 | Koves et al. |
| 5,365,560 A | 11/1994 | Tam |
| 5,447,024 A | 9/1995 | Ishida et al. |
| 5,456,807 A * | 10/1995 | Wachsman ............ B01D 53/326 204/252 |
| 5,509,362 A | 4/1996 | Lyon |
| 5,518,187 A | 5/1996 | Bruno et al. |
| 5,529,599 A | 6/1996 | Calderon |
| 5,630,368 A | 5/1997 | Wagoner |
| 5,730,763 A | 3/1998 | Manulescu et al. |
| 5,770,310 A | 6/1998 | Noguchi et al. |
| 5,827,496 A | 10/1998 | Lyon |
| 5,858,210 A | 1/1999 | Richardson |
| 5,965,098 A * | 10/1999 | Boegner ............ B01D 53/9418 423/213.5 |
| 6,007,699 A | 12/1999 | Cole |
| 6,030,589 A * | 2/2000 | Hartweg ............ B01D 53/8628 423/213.2 |
| 6,143,203 A | 11/2000 | Zeng et al. |
| 6,143,253 A | 11/2000 | Radcliffe et al. |
| 6,180,354 B1 | 1/2001 | Singh et al. |
| 6,187,465 B1 | 2/2001 | Galloway |
| 6,361,757 B1 | 3/2002 | Shikada et al. |
| 6,395,944 B1 | 5/2002 | Griffiths |
| 6,412,559 B1 | 7/2002 | Gunter et al. |
| 6,444,712 B1 | 9/2002 | Janda |
| 6,494,153 B1 | 12/2002 | Lyon |
| 6,506,351 B1 * | 1/2003 | Jain ........................ B01D 53/06 423/239.1 |
| 6,509,000 B1 | 1/2003 | Choudhary et al. |
| 6,517,631 B1 | 2/2003 | Bland |
| 6,607,704 B2 * | 8/2003 | Guttridge ............ B01D 53/9422 423/213.2 |
| 6,631,698 B1 | 10/2003 | Hyppanen et al. |
| 6,642,174 B2 | 11/2003 | Gaffney et al. |
| 6,663,681 B2 | 12/2003 | Kinding et al. |
| 6,667,022 B2 | 12/2003 | Cole |
| 6,669,917 B2 | 12/2003 | Lyon |
| 6,682,714 B2 | 1/2004 | Kindig et al. |
| 6,685,754 B2 | 2/2004 | Kindig et al. |
| 6,703,343 B2 | 3/2004 | Park |
| 6,797,253 B2 | 9/2004 | Lyon |
| 6,834,623 B2 | 12/2004 | Cheng |
| 6,875,411 B2 | 4/2005 | Sanfilippo et al. |
| 6,880,635 B2 | 4/2005 | Vinegar et al. |
| 6,936,363 B2 | 8/2005 | Kordesch et al. |
| 7,001,579 B2 | 2/2006 | Metzger et al. |
| 7,067,456 B2 | 6/2006 | Fan et al. |
| 7,244,399 B2 | 7/2007 | Myohanen et al. |
| 7,404,942 B2 | 7/2008 | Sanfilippo et al. |
| 7,496,450 B2 | 2/2009 | Ortiz Aleman et al. |
| 7,749,626 B2 | 7/2010 | Take |
| 7,767,191 B2 | 8/2010 | Thomas et al. |
| 7,837,975 B2 | 11/2010 | Iyer et al. |
| 7,840,053 B2 | 11/2010 | Liao |
| 8,116,430 B1 | 2/2012 | Shapiro et al. |
| 8,192,706 B2 | 6/2012 | Grochowski |
| 8,202,349 B2 | 6/2012 | Molaison |
| 8,419,813 B2 | 4/2013 | Hoteit et al. |
| 8,435,920 B2 | 5/2013 | White et al. |
| 8,508,238 B2 | 8/2013 | Mahalingam et al. |
| 8,562,928 B2 | 10/2013 | Gupta |
| 8,761,943 B2 | 6/2014 | Lou et al. |
| 8,771,549 B2 | 7/2014 | Gauthier et al. |
| 8,814,963 B2 | 8/2014 | Apanel et al. |
| 8,877,147 B2 | 11/2014 | Fan et al. |
| 8,877,150 B1 * | 11/2014 | Fan ........................ B01D 53/60 423/210 |
| 9,017,627 B2 | 4/2015 | Gupta |
| 9,290,386 B2 | 3/2016 | Wasas |
| 9,376,318 B2 | 6/2016 | Fan et al. |
| 9,382,359 B2 | 7/2016 | Kanellopoulos et al. |
| 9,518,236 B2 | 12/2016 | Fan et al. |
| 9,573,118 B2 | 2/2017 | Colozzi et al. |
| 9,616,403 B2 | 4/2017 | Fan et al. |
| 9,777,920 B2 | 10/2017 | Fan et al. |
| 9,903,584 B2 | 2/2018 | Fan et al. |
| 2001/0055559 A1 | 12/2001 | Sanfilippo et al. |
| 2002/0011428 A1 | 1/2002 | Scheuerman |
| 2002/0179887 A1 | 12/2002 | Zeng et al. |
| 2003/0006026 A1 | 1/2003 | Matsumoto et al. |
| 2003/0024388 A1 | 2/2003 | Scharpf |

(56) References Cited

U.S. PATENT DOCUMENTS

| | | |
|---|---|---|
| 2003/0031291 A1 | 2/2003 | Yamamoto et al. |
| 2003/0119658 A1 | 6/2003 | Allison et al. |
| 2003/0124041 A1* | 7/2003 | Neumann ............ B01D 53/565 423/235 |
| 2003/0130360 A1 | 7/2003 | Kindig et al. |
| 2003/0180215 A1 | 9/2003 | Niu et al. |
| 2003/0188668 A1 | 10/2003 | Bland |
| 2004/0028181 A1 | 2/2004 | Charles, Jr. et al. |
| 2004/0030214 A1 | 2/2004 | Schindler et al. |
| 2004/0109800 A1 | 6/2004 | Pahlman et al. |
| 2004/0126293 A1 | 7/2004 | Geerlings et al. |
| 2004/0131531 A1 | 7/2004 | Geerlings et al. |
| 2004/0132833 A1 | 7/2004 | Espinoza et al. |
| 2004/0138060 A1 | 7/2004 | Rapier et al. |
| 2004/0152790 A1 | 8/2004 | Cornaro et al. |
| 2004/0154223 A1 | 8/2004 | Powell et al. |
| 2004/0197612 A1 | 10/2004 | Keefer et al. |
| 2004/0213705 A1 | 10/2004 | Blencoe et al. |
| 2004/0233191 A1 | 11/2004 | Mukherjee et al. |
| 2004/0244289 A1 | 12/2004 | Morozumi et al. |
| 2004/0265224 A1 | 12/2004 | Papavassiliou et al. |
| 2005/0002847 A1 | 1/2005 | Maroto-Valer et al. |
| 2005/0054880 A1 | 3/2005 | Dubois et al. |
| 2005/0175533 A1 | 8/2005 | Thomas et al. |
| 2005/0255037 A1 | 11/2005 | Otsuka et al. |
| 2005/0265912 A1 | 12/2005 | Alvarez, Jr. et al. |
| 2005/0274648 A1 | 12/2005 | Goldstein et al. |
| 2006/0021308 A1 | 2/2006 | Merkel |
| 2006/0042565 A1 | 3/2006 | Hu |
| 2006/0094593 A1 | 5/2006 | Beech, Jr. et al. |
| 2007/0010588 A1 | 1/2007 | Pearson |
| 2007/0049489 A1 | 3/2007 | Becue et al. |
| 2007/0157517 A1 | 7/2007 | Tsay et al. |
| 2007/0258878 A1 | 11/2007 | Sanfilippo et al. |
| 2008/0031809 A1 | 2/2008 | Norbeck et al. |
| 2008/0161624 A1 | 7/2008 | Glover et al. |
| 2008/0164443 A1 | 7/2008 | White et al. |
| 2008/0209807 A1 | 9/2008 | Tsangaris et al. |
| 2008/0314838 A1 | 12/2008 | Becker et al. |
| 2009/0000194 A1 | 1/2009 | Fan et al. |
| 2009/0042070 A1 | 2/2009 | Brown et al. |
| 2009/0160461 A1 | 6/2009 | Zangl et al. |
| 2010/0071262 A1 | 3/2010 | Robinson et al. |
| 2010/0184589 A1 | 7/2010 | Miyairi et al. |
| 2010/0187159 A1 | 7/2010 | Naunheimer |
| 2010/0258429 A1 | 10/2010 | Ugolin |
| 2010/0293845 A1 | 11/2010 | Zeman et al. |
| 2010/0332170 A1 | 12/2010 | Gao et al. |
| 2011/0005395 A1 | 1/2011 | Vimalchand et al. |
| 2011/0011720 A1 | 1/2011 | Rinker |
| 2011/0024687 A1 | 2/2011 | White et al. |
| 2011/0054049 A1 | 3/2011 | Lambert et al. |
| 2011/0094226 A1 | 4/2011 | McHugh et al. |
| 2011/0100274 A1 | 5/2011 | Kuske et al. |
| 2011/0138788 A1* | 6/2011 | Kanda ............ B01D 53/56 60/299 |
| 2011/0146152 A1 | 6/2011 | Vimalchand et al. |
| 2011/0176968 A1 | 7/2011 | Fan et al. |
| 2011/0176988 A1 | 7/2011 | Okamura et al. |
| 2011/0206469 A1 | 8/2011 | Furuyama et al. |
| 2011/0289845 A1 | 12/2011 | Davis et al. |
| 2011/0291051 A1 | 12/2011 | Hershkowitz et al. |
| 2011/0300060 A1 | 12/2011 | Guillou et al. |
| 2011/0303875 A1 | 12/2011 | Hoteit et al. |
| 2012/0159841 A1 | 6/2012 | Fan et al. |
| 2012/0167585 A1 | 7/2012 | Wormser |
| 2012/0171588 A1 | 7/2012 | Fan et al. |
| 2012/0214106 A1 | 8/2012 | Sit et al. |
| 2013/0085365 A1 | 4/2013 | Marashdeh et al. |
| 2013/0149650 A1 | 6/2013 | Gauthier et al. |
| 2013/0255272 A1 | 10/2013 | Ajhar et al. |
| 2013/0261355 A1 | 10/2013 | Stamires |
| 2014/0034134 A1 | 2/2014 | Fan et al. |
| 2014/0072917 A1 | 3/2014 | Fan et al. |
| 2014/0144082 A1 | 5/2014 | Fan et al. |
| 2014/0275297 A1 | 9/2014 | Velazquez-Vargas et al. |
| 2014/0295361 A1 | 10/2014 | Fan et al. |
| 2015/0093577 A1 | 4/2015 | Fan et al. |
| 2015/0238915 A1 | 8/2015 | Fan et al. |
| 2015/0343416 A1* | 12/2015 | Fadhel ............ B01J 20/06 252/186.1 |
| 2016/0002034 A1 | 1/2016 | Fan et al. |
| 2016/0016137 A1 | 1/2016 | Fan et al. |
| 2016/0016800 A1 | 1/2016 | Noyes |
| 2016/0023190 A1 | 1/2016 | Fan et al. |
| 2016/0030904 A1 | 2/2016 | Fan et al. |
| 2016/0268616 A1 | 9/2016 | Fan et al. |
| 2016/0376512 A1 | 12/2016 | Fan et al. |
| 2018/0296978 A1* | 10/2018 | Peck ............ B01D 53/9413 |
| 2019/0003704 A1* | 1/2019 | Aranda ............ B01J 8/26 |

FOREIGN PATENT DOCUMENTS

| | | | | |
|---|---|---|---|---|
| CN | 1501534 | | 6/2004 | |
| CN | 101389734 | | 3/2009 | |
| CN | 101426885 | | 5/2009 | |
| CN | 102187153 | | 9/2011 | |
| CN | 102612625 | | 7/2012 | |
| CN | 102686301 A | * | 9/2012 | ......... B01D 53/8628 |
| EP | 0161970 | | 11/1985 | |
| EP | 1134187 | | 9/2001 | |
| EP | 1445018 | | 8/2004 | |
| EP | 1580162 | | 9/2005 | |
| EP | 1845579 | | 10/2007 | |
| EP | 1933087 | | 6/2008 | |
| EP | 2279785 A2 | * | 2/2011 | ............ B01D 53/56 |
| EP | 2450420 | | 5/2012 | |
| EP | 2495030 A2 | * | 9/2012 | ......... B01D 53/8628 |
| EP | 2515038 | | 10/2012 | |
| EP | 2601443 | | 6/2013 | |
| EP | 1976633 | | 3/2014 | |
| FR | 2924035 | | 5/2009 | |
| JP | H10249153 | | 9/1998 | |
| JP | 2006-502957 | | 1/2006 | |
| KR | 2006096609 A | * | 9/2006 | ............ B01D 53/56 |
| TW | 406055 | | 9/2000 | |
| TW | 426728 | | 3/2001 | |
| WO | WO 1990/13773 | | 11/1990 | |
| WO | WO 1999/65097 | | 12/1999 | |
| WO | WO 2000/22690 | | 4/2000 | |
| WO | WO 2000/068339 | | 11/2000 | |
| WO | WO 2001/042132 | | 6/2001 | |
| WO | WO 2003/070629 | | 8/2003 | |
| WO | WO 2007/082089 | | 7/2007 | |
| WO | WO 2007/122498 | | 11/2007 | |
| WO | WO 2007/134075 | | 11/2007 | |
| WO | WO 2008/019079 | | 2/2008 | |
| WO | WO 2008/071215 | | 6/2008 | |
| WO | WO 2008/082312 | | 7/2008 | |
| WO | WO 2008/115076 | | 9/2008 | |
| WO | WO 2009/007200 | | 1/2009 | |
| WO | WO 2009/009388 | | 1/2009 | |
| WO | WO 2009/021258 | | 2/2009 | |
| WO | WO 2009/023515 A2 | | 2/2009 | |
| WO | WO 2009/114309 | | 9/2009 | |
| WO | WO 2010/037011 | | 4/2010 | |
| WO | WO 2010/063923 | | 6/2010 | |
| WO | WO 2010/126617 | | 11/2010 | |
| WO | WO 2011/021161 | | 2/2011 | |
| WO | WO 2011/031752 | | 3/2011 | |
| WO | WO 2011/031755 | | 3/2011 | |
| WO | WO 2011/084734 | | 7/2011 | |
| WO | WO 2012/064712 | | 5/2012 | |
| WO | WO 2012/077978 | | 6/2012 | |
| WO | WO 2012/155054 | | 11/2012 | |
| WO | WO 2012/155059 | | 11/2012 | |
| WO | WO 2013/040645 | | 3/2013 | |
| WO | WO 2014/085243 | | 6/2014 | |
| WO | WO2014/124011 | | 8/2014 | |
| WO | WO2014/152814 | | 9/2014 | |
| WO | WO2014/159956 | | 10/2014 | |
| WO | WO2014/160223 | | 10/2014 | |
| WO | WO 2011/153568 | | 12/2014 | |
| WO | WO 2014/195904 | | 12/2014 | |

(56) References Cited

FOREIGN PATENT DOCUMENTS

| WO | WO2015/131117 | 9/2015 |
|----|---|---|
| WO | WO 2016/053941 | 4/2016 |
| WO | WO2017/180763 | 10/2017 |
| WO | WO2017/205638 | 11/2017 |

OTHER PUBLICATIONS

Ahern et al., "Comparison of fenofibratemesoporous silica drug-loading processes for enhanced drug delivery," Eur. J. Pharm. Sci., 2013, 50, 400-409.
Alalwan et al., "Co3O4 nanoparticles as oxygen carriers for chemical looping combustion: A materials characterization approach to understanding oxygen carrier performance," Chemical Engineering Journal, 2017, 319, 279-287.
Alalwan et al., "β-Fe2O3 Nanoparticles as Oxygen Carriers for Chemical Looping Combustion: An Integrated Materials Characterization Approach to Understanding Oxygen Carrier Performance, Reduction Mechanism, and Particle Size Effects," Energy Fuels, 2018, 32, 7959-7970.
Anisimov et al., "Density-functional calculation of effective Coulomb interactions in metals," Phys. Rev. B, 1991, 43, 7570.
Barreca et al., "Methanolysis of styrene oxide catalysed by a highly efficient zirconium-doped mesoporous silica," Appl. Catal. A, 2006, 304, 14-20.
Burke et al., "Large pore bi-functionalised mesoporous silica for metal ion pollution treatment," J. Hazard. Mater., 2009, 164, 229-234.
Cheng et al., "Oxygen vacancy promoted methane partial oxidation over iron oxide oxygen carrier in chemical looping process," Phys. Chem. Chem. Phys., 2016, 18, 32418-32428.
Chung et al., "Chemically and physically robust, commercially-viable iron-based composite oxygen carriers sustainable over 3000 redox cycles at high temperatures for chemical looping applications," Energy Environ. Sci., 2017, 10, 2318-2323.
Coleman et al., "Synthesis and characterization of dimensionally ordered semiconductor nanowires within mesoporous silica," J. Am. Chem. Soc., 2001, 123, 7010-7016.
Delaney et al., "Development of chemically engineered porous metal oxides for phosphate removal," J. Hazard. Mater., 2011, 185, 382-391.
Delaney et al., "Porous silica spheres as indoor air pollutant scavengers," J. Environ. Monit., 2010, 12, 2244-2251.
Flynn et aL, "Pervaporation performance enhancement through the incorporation of mesoporous silica spheres into PVA membranes," Sep. Purif. Technol., 2013, 118, 73-80.
Ghoneim et al., "Review on innovative catalytic reforming of natural gas to syngas," World J. Eng. Technol, 2016, 4(1):116-139.
Grimme et al., "A consistent and accurate ab initio parametrization of density functional dispersion correction (DFT-D) for the 94 elements H—Pu," J. Chem. Phys., 2010, 132, 19.
Grimme et al., "Effect of the damping function in dispersion corrected density functional theory," J. Comput. Chem., 2011, 32, 1456-1465.
Henkelman et aL, "A climbing image nudged elastic band method for finding saddle points and minimum energy paths," J. Chem. Phys., 2000, 113, 9901-9904.
Herbst et al., "Relativistic calculations of 4f excitation energies in the rare-earth metals: Further results," Phys. Rev. B, 1978, 17, 3089.
Kresse et al., "Ab initio molecular dynamics for liquid metals," Phys. Rev. B, 1993, 47, 558.
Kresse et al., "Efficiency of ab-initio total energy calculations for metals and semiconductors using a plane-wave basis set," Comput. Mater. Sci., 1996, 6, 15-50.
Kresse et al., "Efficient iterative schemes for ab initio total-energy calculations using a plane-wave basis set," Phys. Rev. B, 1996, 54, 11169.
Kumar et al., "Direct air capture of CO2 by physisorbent materials," Angew. Chem., Int. Ed., 2015, 54, 14372-14377.

Nipattummakul et al., "Hydrogen and syngas production from sewage sludge via steam gasification," Fuel and Energy Abstracts, 2010, 35 (21), 11738-11745.
Perdew et al., "Generalized gradient approximation made simple," Phys. Rev. Lett., 1996, 77, 3865.
Qin et al., "Enhanced methane monversion in mhemical looping partial oxidation systems using a copper doping modification," Appl. Catal. B, 2018, 235, 143-149.
Rollmann et al., "First-principles calculation of the structure and magnetic phases of hematite," Phys. Rev. B, 2004, 69, 165107.
Sheppard et al., "Paths to which the nudged elastic band converges," J. Comput. Chem., 2011, 32, 1769-1771.
Speight, "Gasification processes for syngas and hydrogen production," Gasification for Synthetic Fuel Production, Woodhead Publishing, 2015, 119-146.
Sun et al., "Review: Fundamentals and challenges of electrochemical CO2 reduction using two-dimensional materials," Chem, 2017, 3, 560-587.
Zeng et al., "Metal oxide redox chemistry for chemical looping processe," Nat Rev Chem., 2018, 2, 349-364.
United States Patent Office Notice of Allowance for U.S. Appl. No. 15/685,951 dated Aug. 12, 2019 (5 pages).
United States Patent Office Notice of Allowance for U.S. Appl. No. 16/166,746 dated Aug. 15, 2019 (8 pages).
United States Patent Office Notice of Allowance for U.S. Appl. No. 15/376,590 dated Jan. 9, 2019 (6 pages).
Rostrup-Nielsen, "Syngas in Perspective," Catalysis Today, 2002, 71(3-4), 243-247.
Takanabe, "Catalytic Conversion of Methane: Carbon Dioxide Reforming and Oxidative Coupling," Journal of the Japan Petroleum Institute, 2012, 55, 1-12.
Carrero et al., "A critical literature review of the kinetics for the oxidative dehydrogenation of propane over well-defined supported vanadium oxide catalysts," ACS Catalysis, 2014, 4: 3357-3380.
Cavani et al., "Oxidative dehydrogenation of ethane and propane: How far from commercial implementation?" Catalysis Today, 2007, 127(1): 113-131.
Koulialias et al., "Ordered defects in Fe 1-x S generate additional magnetic anisotropy symmetries," Journal of Applied Physics, 2018, 123(3): 033902, 10 pages.
Moreira, "Steam Cracking: Kinetics and Feed Characterization," Dissertation, 2015, 10 pages.
Wang et al., "Highly efficient metal sulfide catalysts for selective dehydrogenation of isobutane to isobutene," ACS Catalysis, 2014, 4: 1139-1143.
United States Patent Office Action for U.S. Appl. No. 15/685,951 dated May 14, 2019 (10 pages).
United States Patent Office Action for U.S. Appl. No. 16/166,746 dated May 1, 2019 (9 pages).
Sattler et al., "Catalytic Dehydrogenation of Light Alkanes on Metals and Metal Oxides," Chem Rev, 2014, 114(20): 10613-10653.
Abad et al., "Chemical-looping combustion in a 300 W continuously operating reactor system using a manganese-based oxygen carrier," Fuel, 2006, vol. 85, Issue 9, pp. 1174-1185.
Abad et al., "Reduction Kinetics of Cu-, Ni-, and Fe-Based Oxygen Carriers Using Syngas (CO + H2) for Chemical-Looping Combustion," Energy Fuels, 2007, 21 (4), pp. 1843-1853.
Abad et al., "The use of iron oxide as oxygen carrier in a chemical-looping reactor," Fuel, 2007, vol. 86, Issues 7-8, pp. 1021-1035.
Adanez et al., "Progress in Chemical-Looping Combustion and Reforming technologies," Progress in Energy and Combustion Science, 2012, vol. 38, Issue 2, pp. 215-282.
Adanez et al., "Selection of oxygen carriers for chemical-looping combustion," Energy & Fuels, American Chemical Society, 2004, vol. 18, No. 2, pp. 371-377.
Azis et al., "On the evaluation of synthetic and natural ilmenite using syngas as fuel in chemical-looping combustion (CLC)," Chemical Engineering Research and Design, 2010, vol. 88, Issue 11, pp. 1505-1514.
Balasubramanian et al., "Hydrogen from methane in a single-step process," Chem Engr Science, 1999, 54(15-16), 3543.

(56) References Cited

OTHER PUBLICATIONS

Bell et al., "H2 Production via Ammonia Decomposition Using Non-Noble Metal Catalysts: A Review," Top Catal, 2016, 59, 1438-1457.
Cao et al., "Investigation of Chemical Looping Combustion by Solid Fuels. 1. Process Analysis," Energy Fuels, 2006, 20(5), pp. 1836-1844.
Cheng et al., "Carbon Dioxide Adsorption and Activation on Ceria (110): A density functional theory study," J. Chem. Phys. 2013, 138, 014702.
Cheng et al., "Methane Adsorption and Dissociation on Iron Oxide Oxygen Carrier: Role of Oxygen Vacancy," Phys. Chem. Chem. Phys. 2016, 18, 16423-16435.
Cheng et al., "Propagation of Olefin Metathesis to Propene on WO3 Catalysts: A Mechanistic and Kinetic Study," ACS Catal. 2015, 5, 59-72.
Cho et al., "Comparison of iron-, nickel-, copper- and manganese-based oxygen carriers for chemical-looping combustion," Fuel, 2004, vol. 83, Issue 9, pp. 1215-1225.
Connell et al., "Process Simulation of Iron-Based Chemical Looping Schemes with CO2 Capture for Hydrogen and Electricity Production from Coal," Presented at 29th Annual International Pittsburgh Coal Conference, Pittsburgh, PA, Oct. 15-18, 2012, pp. 1274-1281.
De Diego et al., "Development of Cu-based oxygen carriers for chemical-looping combustion," Fuel, 2004, vol. 83, Issue 13, pp. 1749-1757.
De Klerk, "Gas-to-Liquid Conversion" Natural Gas Conversion Technologies Workshop of ARPA-E. U.S. Department of Energy, Houston, TX. vol. 13 (2012).
Denton et al., "Simultaneous Production of High-Purity Hydrogen and Sequestration-Ready CO2 from Syngas," 2003.
EIA—Independent Statistics and Analysis. U.S. Department of Energy, U.S. Energy Information Administration "Annual Energy Outlook 2015 with Projections to 2040," Apr. 2015.
EIA—Independent Statistics and Analysis. U.S. Department of Energy, U.S. Energy Information Administration, "How Much Petroleum Does the United States Import and from Where?" <https://www.eia.gov/tools/faqs/faq.php?id=727&t=6> webpage available as early as Mar. 22, 2017.
EIA—Independent Statistics and Analysis. U.S. Department of Energy, U.S. Energy Information Administration, "Natural Gas Vented and Flared." <https://www.eia.govidnaving/NG_PROD_SUM_A_EPG0_VGV_MMCF_A.htm> webpage available as early as Feb. 29, 2016.
EIA—Independent Statistics and Analysis. U.S. Department of Energy, U.S. Energy Information Administration, "Natural Gas Weekly Update." <https://www.eia.gov/naturalgas/weekly/> webpage available as early as Dec. 4, 2011.
Environmental Protection Agency, "Geological CO2 Sequestration Technology and Cost Analysis," Technical Support Document, pp. i-vi & pp. 1-61, Jun. 2008.
Fan et al., "Chemical looping processes for CO2 capture and carbonaceous fuel conversion prospect and opportunity," Energy Environmental Science, 2012, p. 7254-7280.
Fan et al., "Utilization of chemical looping strategy in coal gasification processes," Particuology, 2008, vol. 6, Issue 3, pp. 131-142.
Fan et al., "Chemical-Looping Technology Platform," AIChE Journal, 61(1), 2-22 (2015).
Fan, "Chemical Looping Systems for Fossil Energy Conversions," Wiley-AIChE: Hoboken, NJ, U.S.A.; 2010.
Forero et al., "Syngas combustion in a 500 Wth Chemical-Looping Combustion system using an impregnated Cu-based oxygen carrier," Fuel Processing Technology, 2009, vol. 90, Issue 12, pp. 1471-1479.
Forzatti, "Present status and perspectives in de-NOx SCR catalysis." Appl. Catal. A: Gen., 222(1-2), 2001, 221-236.
Gao et al., "Production of syngas via autothermal reforming of methane in a fluidized-bed reactor over the combined $CeO_2$—$ZrO_2$/$SiO_2$ supported Ni catalysts," International Journal of Hydrogen Energy, 2008, vol. 33, p. 5493-5500.
Garcia-Labiano et al., "Temperature variations in the oxygen carrier particles during their reduction and oxidation in a chemical-looping combustion system," Chemical Engineering Science, 2005, vol. 60, No. 3, pp. 851-862.
Geldart, "Types of Gas Fluidization," Power Technology, vol. 7, pp. 285-292, 1973.
Ghanapragasam et al., "Hydrogen production from coal direct chemical looping and syngas chemical looping combustion systems: Assessment of system operation and resource requirements," International Journal of Hydrogen Energy, 2009, vol. 34, Issue 6, pp. 2606-2615.
Go et al., "Hydrogen production from two-step steam methane reforming in a fluidized bed reactor," International Journal of Hydrogen Energy, 2009, vol. 34, p. 1301-1309.
Goellner, J. F., V. Shah, M. J. Turner, N. J. Kuehn, J. Littlefield, G. Cooney, and J. Marriott, "Analysis of Natural Gas-to Liquid Transportation Fuels via Fischer-Tropsch," United States Department of Energy/NETL, DOE/NETL-2013/1597, Pittsburgh, PA (2013).
Haque, "Microwave energy for mineral treatment processes—a brief review," International Journal of Mineral Processing vol. 57, pp. 1-24, 1999.
Herzog, "Carbon Sequestration via Mineral Carbonation: Overview and Assessment," MIT Laboratory for Energy and the Environmental, http://sequestration.mit.edu/pfd/carbonates.pdf, Mar. 14, 2002.
Hildebrandt et al., "Producing Transportation Fuels with Less Work," Science, Mar. 27, 2009, vol. 323, pp. 1680-1681.
Hossain et al., "Chemical-looping combustion (CLC) for inherent CO2 separations—a review," Chemical Engineering Science, 2008, vol. 63, Issue 18, pp. 4433-4451.
Hua et al., "Three Dimensional Analysis of Electrical Capacitance Tomography Sensing Fields," 1999 IOP Publishing LTD, vol. 10, pp. 717-725.
Huijgen et al., "Carbon dioxide sequestrationby mineral carbonation," ECN-C—03-016, www.ecn.nl/docs/library/report/200e/c03016.pdf, Feb. 2003.
Hung et al., "Zeolite ZSM-5 Supported Bimetallic Fe-Based Catalysts for Selective Catalytic Reduction of NO: Effects of Acidity and Metal Loading," Advanced Porous Materials, 2016, 4(3): 189-199(11).
Imanaka et al., "Advances in Direct NOx Decomposition Catalysts," Appl. Catal. A: Gen., 431-432, 2012, 1-8.
Ishida et al., "Evaluation of a Chemical-Looping-Combustion Power-Generation System by Graphic Exergy Analysis," Energy, 12(2), 147-154 (1987).
Iwamoto et al., "Influence of sulfur dioxide on catalytic removal of nitric oxide over copper ion-exchanged ZSM-5 Zeolite." Appl. Catal., 69(2), 1991, 15-19.
Izquierdo et al., "Catalyst Deactivation and Regeneration Processes in Biogas Tri-Reforming Process. The Effect of Hydrogen Sulfide Addition," Catalysts, 2018, 8(12): 19 pages.
Jadhav et al., "Carbonation of Mg-Bearing Minerals: Kinetic and Mechanistic Studies," Ohio Coal Research Consortium/Ohio State University Project C3.12, www.ohiocoal.org/projects/year3/c3.12, Jul. 3, 2002.
Jin et al., "Development of a Novel Chemical-Looping Combustion: Synthesis of a Looping Material with a Double Metal Oxide of CoO—NiO," Energy & Fuels, 1998, vol. 12, 1272-1277.
Johansson et al., "Combustion of Syngas and Natural Gas in a 300 W Chemical-Looping Combustor," Chemical Engineering Research and Design Volume, 2006, vol. 84, Issue 9, pp. 819-827.
Kaiser et al., "Precombustion and Postcombustion Decarbonization," IEEE, Power Engineering Review, Apr. 2001, pp. 15-17.
Kathe et al., "Chemical Looping Gasification for Hydrogen Enhanced Syngas Production with in-situ CO2 Capture," United States Department of Energy, OSTI: 1185194, (2015).
Kiuchi et al., "Recovery of hydrogen from hydrogen sulfide with metals or metal sulfides," Int. J. Hydrogen Energy, 1982, 7: 477-482.
Leion et al., "Solid fuels in chemical-looping combustion using oxide scale and unprocessed iron ore as oxygen carriers," Fuel, 2009, vol. 88, Issue 10, pp. 1945-1954.

(56) References Cited

OTHER PUBLICATIONS

Leion et al., "Solid fuels in chemical-looping combustion," International Journal of Greenhouse Gas Control, 2008, vol. 2, Issue 2, pp. 180-193.
Leion et al., "The use of petroleum coke as fuel in chemical-looping combustion," Fuel, 2007, vol. 86, Issue 12-13, pp. 1947-1958.
Li et al., "Clean coal conversion processes—progress and challenges," The Royal Society of Chemistry, Energy & Environmental Science, Jul. 30, 2008, vol. 1, pp. 248-267.
Li et al., "Ionic Diffusion in the Oxidation of Iron-effect of Support and Its Implications to Chemical Looping Applications," Energy Environ. Sci. 2011, 4, 876-880.
Li et al., "Role of Metal Oxide Support in Redox Reactions of Iron Oxide for Chemical Looping Applications: Experiments and Density Functional Theory Calculations," Energy Environmental Science, 2011, vol. 4, p. 3661-3667.
Li et al., "Syngas chemical looping gasification process: Bench-scale studies and reactor simulations," AICHE Journal, 2010, vol. 56, Issue 8, pp. 2186-2199.
Li et al., "Syngas Chemical Looping Gasification Process: Oxygen Carrier Particle Selection and Performance," Energy Fuels, 2009, 23(8), pp. 4182-4189.
Liu et al., "Enhanced Performance of Alkali Metal Doped Fe2O3 and Fe2O3/Al2O3 Composites as Oxygen Carrier Material in Chemical Looping Combustion," Energy Fuels. 2013, 27, 4977-4983.
Liu et al., "Recent Advances in Catalytic DeNOx Science and Technology," Catalysis Reviews, 48(1), 2006, 43-89.
Luo et al., "Shale Gas-to-Syngas Chemical Looping Process for Stable Shale Gas Conversion to High Purity Syngas with H2:CO Ratio of 2:1," Energy and Environmental Science, 7(12), 4104-4117, (2014).
Lyngfelt, "Chemical Looping Combustion of Solid Fuels—Status of Development," Applied Energy, 2014, vol. 113, p. 1869-1873.
Lyngfelt, "Oxygen Carriers for Chemical Looping Combustion Operational Experience," 1st International Conference on Chemical Looping, Mar. 2010.
Makepeace et al., "Ammonia decomposition catalysis using non-stoichiometric lithium imide," Chem. Sci., 2015, 6, 3805.
Mannan et al., "Simultaneous steam and CO2 reforming of methane to syngas over NiO/MgO/SA-5205 in presence and absence of oxygen," Applied Catalysis A, 1998, vol. 168, p. 33-46.
Mao et al., "Facile synthesis of phase-pure FeCr2Se4 and FeCr2S4 nanocrystals via a wet chemistry method," J. Mater. Chem. C, 2014, 2: 3744-3749.
Marashdeh, Q. et al., "A Multimodal Tomography System Based on ECT Sensors," IEEE Sensors Journal, vol. 7, No. 3, 2007, 426-433.
Marashdeh, Q., Advances in Electrical Capacitance Tomography, Dissertation, The Ohio State University, 2006.
Masui et al.,"Direct Decomposition of NO into N2 and O2 Over C-type Cubic Y2O3—Tb4O7—ZrO2," Materials Sciences and Applications, 3(10), 2012, 733-738.
Mattisson et al., "Application of chemical-looping combustion with capture of CO2," Second Nordic Minisymposium on Carbon Dioxide Capture and Storage, Goeteborg, Oct. 26, 2001, pp. 46-51.
Mattisson et al., "Chemical-looping combustion using syngas as fuel," International Journal of Greenhouse Gas control, 2007, vol. 1, Issue 2, pp. 158-169.
Mattis Son et al., "CO 2 capture from coal combustion using chemical-looping combustion—Reactivity investigation of Fe, Ni and Mn based oxygen carriers using syngas," Department of Energy and Environment, Division of Energy Technology and Department of Chemical and Biological Engineering, Division of Environmental Inorganic Chemistry, Chalmers University of Technology, 2007.
Mattisson et al., "Reactivity of Some Metal Oxides Supported on Alumina with Alternating Methane and Oxygen—Application for Chemical-Looping Combustion," Energy & Fuels, 2003, vol. 17, pp. 643-651.

Mattisson et al., "The use of iron oxide as an oxygen carrier in chemical-looping combustion of methane with inherent separation of CO2," Fuel, 2001, vol. 80, pp. 1953-1962.
Mattisson et al., "Use of Ores and Industrial Products as Oxygen Carriers in Chemical-Looping Combustion," Energy & Fuels, 2009, vol. 23, pp. 2307-2315.
Miller et al., "Toward Transformational Carbon Capture," AIChE Journal, 62, 1-10 (2016).
NETL, National Energy Technology Laboratory. U.S. Department of Energy, "Quality Guidelines for Energy System Studies—Specification for Selected Feedstocks." Jan. 2012.
NETL, National Energy Technology Laboratory. U.S. Department of Energy, "Syngas Contaminant Removal and Conditioning," webpage accessed on Jul. 8, 2018.
Ockwig et al., "Membranes for Hydrogen Separation," American Chemical Society, Chem. Rev., Oct. 10, 2007, vol. 107, pp. 4078-4110.
O'Connor et al., "Carbon Dioxide Sequestration by Direct Mineral Carbonation: Results from Recent Studies and Currents Status," Abstract, USDOE Office of Fossil Energy, 2001.
Ohio Coal Development Office of the Ohio Air Quality Development Authority, "Ohio Coal Research Consortium (OCRC)—IV, Year 3 Proposal Solicitation," http://www.ohioquality.org/ocdo/other_pdf/Consortium_IV_Year_3_RFP.pdf (2006).
Ortiz et al., "Hydrogen Production by Auto-Thermal Chemical-Looping Reforming in a Pressurized Fluidized Bed Reactor Using Ni-based Oxygen Carriers," International Journal of Hydrogen Energy, 2010, vol. 35, p. 151-160.
Osha, "Hydrogen Sulfide in Workplaces," <https://www.osha.gov/SLTC/hydrogensulfide/hydrogensulfide_found.html> webpage accessed Jul. 8, 2018.
Park et al., "CO2 Mineral Sequestration: Chemically Enhanced Aqueous Carbonation of Serpentine," The Canadian Journal of Chemical Engineering, 2003, vol. 81, pp. 885-890.
Park et al., "CO2 Mineral Sequestration: physically activated dissolution of serpentine and pH swing process," Chemical Engineering Science, 2004, vol. 59, pp. 5241-5247.
Pröll et al., "Syngas and a separate nitrogen/argon stream via chemical looping reforming—A 140 kW pilot plant study," Fuel, 2010, vol. 89, Issue 6, pp. 1249-1256.
Qin et al., "Evolution of Nanoscale Morphology in Single and Binary Metal Oxide Microparticles During Reduction and Oxidation Processes," J. Mater. Chem. A. 2014, 2, 17511-17520.
Qin et al., "Impact of 1% Lathanum Dopant on Carbonaceous Fuel Redox Reactions with an Iron-Based Oxygen Carrier in Chemical Looping Processes," ACS Energy Letters, 2017, 2, 70-74.
Qin et al., "Nanostructure Formation Mechanism and Ion Diffusion in Iron-Titanium Composite Materials with Chemical Looping Redox Reactions," J. Mater. Chem. A. 2015, 3, 11302-11312.
Quin et al., "Improved Cyclic redox reactivity of lanthanum modified iron-based oxygen carriers in carbon monoxide xhemical looping combustion," Journal of Materials Chemistry A, 2017, 8 pages.
Ruchens Iein et al., "Carbon dioxide reforming of methane over nickel/alkaline earth metal oxide catalysts," Applied Catalysis A, 1995, vol. 133, p. 149-161.
Russo et al., "Impact of Process Design of on the Multiplicity Behavior of a Jacketed Exothermic CSTR," AICHE Journal, Jan. 1995, vol. 41, No. 1, pp. 135-147.
Ryden et al., "Synthesis gas generation by chemical-looping reforming in a continuously operating laboratory reactor," Fuel, 2006, vol. 85, p. 1631-1641.
Sassi et al., "Sulfur Recovery from Acid Gas Using the Claus Process and High Temperature Air Combustion ( HiTAC ) Technology," Am. J. Environ. Sci., 2008, 4, 502-511.
Scott et al., "In situ gasification of a solid fuel and CO2 separation using chemical looping," AICHE Journal, 2006, vol. 52, Issue 9, pp. 3325-3328.
Shen et al., "Chemical-Looping Combustion of Biomass in a 10kWth Reactor with Iron Oxide as an Oxygen Carrier," Energy & Fuels, 2009, vol. 23, pp. 2498-2505.

(56) References Cited

OTHER PUBLICATIONS

Shen et al., "Experiments on chemical looping combustion of coal with a NiO based oxygen carrier," Combustion and Flame, 2009, vol. 156, Issue 3, pp. 721-728.
Shick et al., "Single crystal growth of $CoCr_2S_4$ and $FeCr_2S_4$," Journal of Crystal Growth, 1969, 5(4): 313-314.
Sridhar et al., "Syngas Chemical Looping Process: Design and Construction of a 25 kWth Subpilot Unit," Energy Fuels, 2012, 26(4), pp. 2292-2302.
Steinfeld et al., "Design Aspects of Solar Thermochemical Engineering—A case Study: Two-Step Water-Splitting Cycle Using the $Fe_3O_4/FeO$ Redox System," Solar Energy, 1999, pp. 43-53.
Steinfeld, "Solar hydrogen production via a two-step water-splitting thermochemical cycle based on Zn/ZnO redox reactions," International Journal of Hydrogen Energy, 2002, vol. 27, pp. 611-619.
Thiollier et al., "Preparation and Catalytic Properties of Chromium-Containing Mixed Sulfides," Journal of Catalysis, 2011, 197(1): 58-67.
Tian et al., "Thermodynamic investigation into carbon deposition and sulfur evolution in a Ca-based chemical-looping combustion system," Chemical Engineering Research & Design, 2011, vol. 89, Issue 9, p. 1524.
Trout et al., "Analysis of the Thermochemistry of NOx Decomposition over CuZSM-5 Based on Quantum Chemical and Statistical Mechanical Calculations," J. Phys. Chem, 100(44), 1996, 17582-17592.
U.S. Department of Energy, NCCTI Energy Technologies Group, Office of Fossil Energy, "CO2 Capture and Storage in Geologic Formations," pp. 34, Revised Jan. 8, 2002.
United States Environmental Protection Agency. "Air Pollution Control Technology Fact Sheet: Selective Catalytic Reforming" <https://www3.epa.gov/ttncatc1/cica/files/fscr.pdf> (2003).
Usachev et al., "Conversion of Hydrocarbons to Synthesis Gas: Problems and Prospects," Petroleum Chemistry, 2011, vol. 51, p. 96-106.
Velazquez-Vargas et al., "Atmospheric Iron-based Coal Direct Chemical Looping (CDCL) Process for Power Generation", presented in Power-Gen International 2012, Orlando, FL, Dec. 11-13, 2012, BR-1892, 1-5.
Vernon et al., "Partial Oxidation of Methane to Synthesis Gas," Catalysis Letters, 1990, vol. 6, p. 181-186.
Wang et al., Study of bimetallic interactions and promoter effects of FeZn, FeMn and FeCr Fischer-Tropsch synthesis catalysts, Journal of Molecular Catalysis A: Chemical, 2010, 326:29-40.
Warsito, W. et al., Electrical Capacitance Volume Tomography, 2007, pp. 1-9.
Watanabe, "Electrical properties of $FeCr_2S_4$ and $CoCr_2S_4$," Solid State Communications, 1973, 12(5): 355-358.
Yamazaki et al., "Development of highly stable nickel catalyst for methane-steam reaction under low steam to carbon ratio," Applied Catalyst A, 1996, vol. 136, p. 49-56.
Yin et. al., "A mini-review on ammonia decomposition catalysts for on-site generation of hydrogen for fuel cell applications," Applied Catalysis A: General, 2004, 277, 1-9.
Zafar et al., "Integrated Hydrogen and Power Production with CO2 Capture Using Chemical-Looping ReformingRedox Reactivity of Particles of CuO, Mn2O3, NiO, and Fe2O3 Using SiO2 as a Support," Ind. Eng. Chem. Res., 2005, 44(10), pp. 3485-3496.
International Preliminary Report on Patentability for International Application PCT/US/2007/000956 dated Jul. 24, 2008.
International Preliminary Report on Patentability for International Application PCT/US/2010/048121 dated Mar. 22, 2012.
International Preliminary Report on Patentability for International Application PCT/US/2010/048125 dated Mar. 22, 2012.
International Preliminary Report on Patentability for International Application PCT/US/2011/059736 dated May 23, 2013.
International Preliminary Report on Patentability for International Application PCT/US/2012/037544 dated Nov. 12, 2013.
International Preliminary Report on Patentability for International Application PCT/US/2012/037557 dated Nov. 21, 2013.
International Search Report and Written Opinion for Application No. PCT/US14/14877 dated May 14, 2014 (10 pages).
International Search Report and Written Opinion for Application No. PCT/US14/25520 dated Jul. 11, 2014 (13 pages).
International Search Report and Written Opinion for Application No. PCT/US14/26071 dated Jul. 10, 2014 (9 pages).
International Search Report and Written Opinion for Application No. PCT/US2007/000956 dated Dec. 4, 2007.
International Search Report and Written Opinion for Application No. PCT/US2009/058579 dated Aug. 3, 2010.
International Search Report and Written Opinion for Application No. PCT/US2010/048121 dated Apr. 1, 2011.
International Search Report and Written Opinion for Application No. PCT/US2010/048125 dated Dec. 17, 2010.
International Search Report and Written Opinion for Application No. PCT/US2011/059736 dated Mar. 27, 2012.
International Search Report and Written Opinion for Application No. PCT/US2012/037544 dated Aug. 10, 2012.
International Search Report and Written Opinion for Application No. PCT/US2012/037557 dated Aug. 13, 2012.
International Search Report and Written Opinion for Application No. PCT/US2014/027839 dated Jul. 24, 2014 (9 pages).
International Search Report and Written Opinion for Application No. PCT/US2014/028217 dated Jul. 28, 2014 (8 pages).
International Search Report and Written Opinion for Application No. PCT/US2015/018123 dated May 8, 2015 (10 pages).
International Search Report and Written Opinion for Application No. PCT/US2017/027241 dated Jul. 10, 2017 (11 pages).
International Search Report and Written Opinion for Application No. PCT/US2017/034503 dated Aug. 15, 2017 (14 pages).
International Search Report and Written Opinion for Application No. PCT/US2018/044530 dated Oct. 17, 2018 (13 pages).
United States Patent Office Action for U.S. Appl. No. 13/394,572 dated Apr. 9, 2014 (26 pages).
United States Patent Office Action for U.S. Appl. No. 13/394,572 dated Aug. 26, 2014 (16 pages).
United States Patent Office Action for U.S. Appl. No. 13/394,572 dated Dec. 30, 2014 (19 pages).
United States Patent Office Action for U.S. Appl. No. 13/394,572 dated Oct. 13, 2015 (21 pages).
United States Patent Office Notice of Allowance for U.S. Appl. No. 13/394,572 dated Dec. 14, 2015 (10 pages).
United States Patent Office Notice of Allowance for U.S. Appl. No. 13/394,572 dated Feb. 22, 2016 (8 pages).
United States Patent Office Action for U.S. Appl. No. 15/162,199 dated Jun. 30, 2016 (10 pages).
United States Patent Office Final Rejection for U.S. Appl. No. 15/162,199 dated Oct. 21, 2016 (9 pages).
United States Patent Office Action for U.S. Appl. No. 13/394,396 dated Dec. 18, 2014 (14 pages).
United States Patent Office Final Rejection for U.S. Appl. No. 13/394,396 dated Jul. 2, 2015 (15 pages).
United States Patent Office Action for U.S. Appl. No. 13/394,396 dated Jan. 15, 2016 (13 pages).
United States Patent Office Notice of Allowance for U.S. Appl. No. 13/394,396 dated Aug. 3, 2016 (8 pages).
United States Patent Office Action for U.S. Appl. No. 15/376,590 dated Mar. 9, 2018 (10 pages).
United States Patent Office Action for U.S. Appl. No. 15/376,590 dated Oct. 19, 2018 (8 pages).
Final Rejection pertaining to U.S. Appl. No. 13/121,009 dated Mar. 14, 2013.
Advisory Action pertaining to U.S. Appl. No. 13/121,009 dated Jun. 24, 2013.
Office Action pertaining to U.S. Appl. No. 13/121,009 dated Sep. 13, 2013.
Final Rejection pertaining to U.S. Appl. No. 13/121,009 dated Jan. 16, 2014.
Office Action pertaining to U.S. Appl. No. 13/121,009 dated Sep. 6, 2012.
United States Patent Office Notice of Allowance for U.S. Appl. No. 14/504,295 dated Sep. 28, 2015 (10 pages).

(56) References Cited

OTHER PUBLICATIONS

United States Patent Office Action for U.S. Appl. No. 15/191,249 dated Dec. 28, 2017 (14 pages).
United States Patent Office Notice of Allowance for U.S. Appl. No. 15/191,249 dated May 22, 2018 (8 pages).
United States Patent Office Action for U.S. Appl. No. 13/883,795 dated Jun. 20, 2016 (15 pages).
United States Patent Office Action for U.S. Appl. No. 13/883,795 dated Jun. 23, 2017 (11 pages).
United States Patent Office Notice of Allowance for U.S. Appl. No. 13/883,795 dated Jan. 22, 2018 (7 pages).
United States Patent Office Action for U.S. Appl. No. 14/116,627 dated Oct. 20, 2016 (6 pages).
United States Patent Office Notice of Allowance for U.S. Appl. No. 14/116,627 dated Mar. 10, 2017 (5 pages).
United States Patent Office Notice of Allowance for U.S. Appl. No. 14/116,627 dated Jun. 14, 2017 (5 pages).
United States Patent Office Final Rejection for U.S. Appl. No. 14/116,636 dated Oct. 24, 2016 (10 pages).
United States Patent Office Notice of Allowance for U.S. Appl. No. 14/116,636 dated Nov. 7, 2017 (5 pages).
United States Patent Office Action for U.S. Appl. No. 14/766,086 dated Jan. 13, 2017 (22 pages).
United States Patent Office Action for U.S. Appl. No. 14/766,086 dated Sep. 7, 2017 (19 pages).
United States Patent Office Action for U.S. Appl. No. 14/766,086 dated Jan. 2, 2018 (21 pages).
United States Patent Office Notice of Allowance for U.S. Appl. No. 14/766,086 dated Aug. 8, 2018 (9 pages).
United States Patent Office Action for U.S. Appl. No. 14/775,044 dated May 30, 2017 (15 pages).
United States Patent Office Action for U.S. Appl. No. 14/775,044 dated Feb. 26, 2018 (16 pages).
United States Patent Office Action for U.S. Appl. No. 14/774,727 dated Sep. 14, 2017 (10 pages).
United States Patent Office Notice of Allowance for U.S. Appl. No. 14/774,730 dated Nov. 16, 2016 (10 pages).
Office Action pertaining to U.S. Appl. No. 12/160,803 dated Jun. 7, 2011.
Final Rejection pertaining to U.S. Appl. No. 12/160,803 dated Jan. 5, 2012.
Office Action pertaining to U.S. Appl. No. 12/160,803 dated Jun. 5, 2012.
Final Rejection pertaining to U.S. Appl. No. 12/160,803 dated Mar. 22, 2013.
Advisory Action pertaining to U.S. Appl. No. 12/160,803 dated Jul. 11, 2013.
Examiner's Answer before the Patent Trial and Appeal Board for U.S. Appl. No. 12/160,803 dated Nov. 4, 2013.
United States Patent Office Action for U.S. Appl. No. 12/160,803 dated Feb. 23, 2016 (27 pages).
United States Patent Office Action for U.S. Appl. No. 14/091,654 dated Jun. 12, 2015 (16 pages).
United States Patent Office Action for U.S. Appl. No. 14/091,654 dated Oct. 30, 2014 (14 pages).
United States Patent Office Action for U.S. Appl. No. 14/091,654 dated Jan. 4, 2016 (17 pages).
United States Patent Office Action for U.S. Appl. No. 14/634,319 dated Nov. 7, 2016 (7 pages).
United States Patent Office Action for U.S. Appl. No. 14/634,319 dated Apr. 11, 2017 (9 pages).
United States Patent Office Action for U.S. Appl. No. 15/647,084 dated Dec. 26, 2017 (7 pages).
United States Patent Office Notice of Allowance for U.S. Appl. No. 15/647,084 dated Mar. 19, 2018 (8 pages).
U.S. Appl. No. 13/394,572, filed Mar. 7, 2012, U.S. Pat. No. 9,371,227, filed Jun. 21, 2016.
U.S. Appl. No. 15/162,199, filed May 23, 2016, 2016/0268616, filed Sep. 15, 2016.
U.S. Appl. No. 16/216,911, filed Dec. 11, 2018.
U.S. Appl. No. 13/394,396, filed Mar. 6, 2012, U.S. Pat. No. 9,518,236, filed Dec. 13, 2016.
U.S. Appl. No. 15/376,590, filed Dec. 12, 2016, 2017/0158964, filed Jun. 8, 2017.
U.S. Appl. No. 11/010,648, filed Dec. 13, 2004, U.S Pat. No. 7,767,191, filed Aug. 30, 2010.
U.S. Appl. No. 13/121,009, filed Mar. 25, 2011, U.S. Pat. No. 8,877,147, filed Nov. 4, 2014.
U.S. Appl. No. 14/504,295, filed Oct. 1, 2014, U.S. Pat. No. 9,376,318, filed Jun. 28, 2016.
U.S. Appl. No. 15/191,249, filed Jun. 23, 2016, 2016/0376512, filed Dec. 29, 2016.
U.S. Appl. No. 13/883,795, filed Nov. 8, 2011, U.S. Pat. No. 10,010,847, filed Jul. 3, 2018.
U.S. Appl. No. 14/116,627, filed May 11, 2012, U.S. Pat. No. 9,777,920, filed Oct. 3, 2017.
U.S. Appl. No. 15/685,951, filed Aug. 24, 2017, 2017-0370573, filed Dec. 28, 2017.
U.S. Appl. No. 14/116,636, filed May 11, 2012, U.S. Pat. No. 9,903,584, filed Dec. 27, 2018.
61/761,016, filed Feb. 5, 2013.
U.S. Appl. No. 61/779,243, filed Mar. 13, 2013.
U.S. Appl. No. 14/766,086, filed Feb. 5, 2014, U.S. Pat. No. 10,144,640, filed Dec. 4, 2018.
U.S. Appl. No. 16/166,746, filed Oct. 22, 2018.
U.S. Appl. No. 61/779,408, filed Mar. 13, 2013.
U.S. Appl. No. 14/775,044, filed Mar. 13, 2014, 2016/0030904, filed Feb. 4, 2016.
U.S. Appl. No. 61/781,452, filed Mar. 14, 2013.
U.S. Appl. No. 61/779,070, filed Mar. 13, 2013.
U.S. Appl. No. 14/774,727, filed Mar. 13, 2014, 2016/0023190, filed Jan. 28, 2016.
U.S. Appl. No. 15/919,748, filed Mar. 13, 2018.
U.S. Appl. No. 61/782,526, filed Mar. 14, 2013.
U.S. Appl. No. 14/774,730, filed Mar. 13, 2014, U.S. Pat. No. 9,616,403, filed Jan. 21, 2016.
PCT/US2014/028217, filed Mar. 14, 2014.
U.S. Appl. No. 61/875,418, filed Sep. 9, 2013.
U.S. Appl. No. 61/875,425, filed Sep. 9, 2013.
U.S. Appl. No. 12/160,803, filed Jul. 14, 2008, 2009/0000194, filed Jan. 1, 2009.
U.S. Appl. No. 14/091,654, filed Nov. 27, 2013, 2014/0144082, filed May 29, 2014.
U.S. Appl. No. 13/644,973, filed Oct. 4, 2012, 2013/0085365, filed Apr. 4, 2013.
U.S. Appl. No. 61/945,257, filed Feb. 27, 2014.
U.S. Appl. No. 62/041,703, filed Aug. 26, 2014.
U.S. Appl. No. 14/634,319, filed Feb. 27, 2015, 2015/0238915, filed Aug. 27, 2015.
U.S. Appl. No. 15/647,084, filed Jul. 11, 2017, U.S. Pat. No. 10,022,693, filed Jul. 17, 2018.
U.S. Appl. No. 62/310,476, filed Mar. 18, 2016.
U.S. Appl. No. 62/321,607, filed Apr. 12, 2016.
U.S. Appl. No. 16/091,253, filed Oct. 4, 2018.
U.S. Appl. No. 62/341,294, filed May 25, 2016.
U.S. Appl. No. 16/091,508, filed Oct. 4, 2018.
U.S. Appl. No. 62/519,376, filed Jun. 14, 2017.
U.S. Appl. No. 62/546,886, filed Aug. 17, 2017.
U.S. Appl. No. 62/539,374, filed Jul. 31, 2017.
U.S. Appl. No. 62/565,565, filed Sep. 29, 2017.
U.S. Appl. No. 62/589,144, filed Nov. 21, 2017.
PCT/US2018/044530, filed Jul. 31, 2018.
U.S. Appl. No. 62/623,355, filed Jan. 29, 2018.
U.S. Appl. No. 62/716,705, filed Aug. 9, 2018.
U.S. Appl. No. 62/734,387, filed Sep. 21, 2018.

\* cited by examiner

SYSTEMS, METHODS AND MATERIALS FOR NOX DECOMPOSITION WITH METAL OXIDE MATERIALS

CROSS-REFERENCE TO RELATED APPLICATIONS

The present application is related to and claims the priority benefit of U.S. Provisional Patent Application No. 62/623,355, filed Jan. 29, 2018, the entire contents of which are incorporated herein by reference.

TECHNICAL FIELD

The present disclosure relates to systems and methods for decomposition of $NO_x$. More particularly, the present disclosure relates to systems and methods for decomposition of $NO_x$ using oxygen uncoupling metal oxide materials.

INTRODUCTION $NO_x$ is a potent pollutant that is produced via the flame combustion of fossil fuels. $NO_x$ can cause acid rains, climate change and the generation of ozone in the troposphere, which is the main constituent of smog. Several strategies for mitigating $NO_x$ emission by decomposing it over a catalyst with the help of a reducing gas, have been investigated and commercially implemented.

$NO_x$ typically refers to NO, $NO_2$ and $N_2O$ with some other variants that are in lower quantities. Currently, selective catalytic reduction (SCR) technology is the dominant technology used to reduce $NO_x$ emissions from power plants, diesel engines, waste incinerators and chemical plants. SCR requires injection of a reducing gas into the flue gas stream which reacts with $NO_x$ over a catalyst bed. Ammonia ($NH_3$) is the popular choice for reducing gas as it has the potential to react with $NO_x$ to emit $N_2$ and $H_2O$ only.

Traditionally, catalysts containing $V_2O_5$, $WO_3$, $MoO_3$ as active metal oxides are used in $NH_3$—SCR, but there are several other catalysts currently being investigated to get higher activity and durability at lower temperatures. Typically, this catalyst composition has a high cost associated with it, adding to the overall operating cost of the process. SCR technology also requires auxiliary units that feed the reducing gas in precise amounts to control the quantity of unreacted reducing gas in the outlet stream. The addition of ammonia/urea lowers the $NO_x$ decomposition temperature to 250-400° C. as compared to direct catalytic $NO_x$ decomposition. $NO_x$ reduction efficiency of the $NH_3$-SCR process is in the range of 70-90%, depending on the temperature of operation. However, these metal oxides are thermally unstable, and deactivate over time. An upcoming class of catalysts are ion-exchanged zeolites (such as Cu-ZSM-5 or Fe-ZSM-5) which show high activity towards $NO_x$ and resistance towards thermal deactivation. A class of metal oxide catalysts have been studied for low temperature $NH_3$-SCR reaction operating at temperatures between 100-300° C. Several catalysts show high activity towards NO decomposition at these low temperatures with the addition of $NH_3$ or hydrocarbons as reducing agents. The catalysts however, show poor selectivity towards $N_2$, converting NO into $N_2O$ or $NO_2$ which are both potent pollutants as well. Apart from ammonia/urea, several other reducing gases have been studied for $NO_x$ decomposition reaction. These include carbon monoxide, hydrocarbons and soot particles reacting over a metal oxide or zeolite-based catalyst. Any SCR process can also be operated without the use of a catalyst; however, this significantly reduces the $NO_x$ decomposition efficiency and requires a much higher operating temperature (800-1150° C.).

Although, $NO_x$ decomposition is thermodynamically favored below 1000° C., the activation energy required for breaking the N—O bond limits the decomposition rate. This activation energy can be lowered by a catalyst, which would assist in breaking the N—O bond. A reducing gas, as mentioned above, can further aid in lowering of the activation energy, however eliminating the use of a reducing gas provides significant benefits with respect to economics and process operation. This also establishes a pathway for a simpler system which has the potential to be environmentally viable. Thus, direct catalytic decomposition has been studied extensively.

In direct catalytic decomposition, the $NO_x$ containing flue gas is sent directly over a catalyst which decomposes $NO_x$ into $N_2$ and $O_2$, which come out of the reactor in the same gas stream. Due to the absence of a reducing agent, the temperature of operation is 700-900° C. to achieve >80% $NO_x$ decomposition efficiency.

Copper ion exchanged ZSM-5 (Cu-ZSM-5) catalyst is one of the most active direct decomposition catalysts. It shows a NO conversion of approximately 95% at temperatures as low as 400° C. However, at temperatures below 700° C., $NO_2$ is produced due to the reaction between the decomposition product $O_2$ and residual NO which are present in the reactor. This is observed in several other direct catalytic decomposition processes and is a major drawback of this strategy. Additionally, Cu-ZSM-5 catalyst is inhibited by $H_2O$ and $SO_2$, with a loss of activity in the presence of $O_2$.

Thermal stability is also another concern with zeolites, which causes irreversible change in the structure of the zeolite. Perovskites-type metal oxides have also shown potential for direct decomposition of $NO_x$. The activity originates from the ability of $ABO_3$ type structure of a perovskite-type oxide allowing for substitutions for creating oxygen vacancies. These oxygen vacancies play a crucial role as the active site for direct $NO_x$ decomposition.

Rare earth sesquioxides with a cubic unit cell have also portrayed activity towards direct decomposition of $NO_x$. To achieve close to 100% NO decomposition, temperatures of 900° C. or higher is typically essential with these metal oxides. With these oxide catalysts mentioned, basicity of the metal oxide was shown to be a key parameter towards activity of the catalyst. However, with the increase in basicity, the inhibition or site blocking effect of other acid gases from flue gas (such as $CO_2$) also increases. Thus, there is a decrease in the NO conversion of between 40% and 80% in the presence of $CO_2$, where $CO_2$ acts as a poison for the catalyst.

Direct decomposition of $NO_x$ is carried out over a catalyst where both $N_2$ and $O_2$ exit the reactor in one stream. Thus, the catalytic system is always under a dynamic equilibrium between $NO_x$, the gas products and the catalyst surface. Hence, any additional $O_2$ in the reactant stream disrupts the equilibrium, reducing the $NO_x$ decomposition efficiency. Additionally, $O_2$ may also react with NO to form $NO_2$, thus reducing the selectivity towards $N_2$. Thus, catalytic processes have been examined over the past decades, to lower the activation barrier. However, as previously mentioned, there are several challenges that the catalytic direct decomposition system faces. The disclosed chemical looping systems mitigate drawbacks of the catalytic system with the use of specialized oxygen uncoupling metal oxides (SOUMO). Disclosed processes split the decomposition reaction into two reactions, separating the $N_2$ and $O_2$ product streams, while also reducing the $NO_x$ decomposition temperature.

SUMMARY

The instant disclosure provides alternatives to the catalytic process by employing specialized oxygen uncoupling metal oxides in a system without the need for a reducing gas.

In one aspect, a method for $NO_x$ decomposition is disclosed. The method includes contacting a first gaseous input stream comprising $NO_x$ with a metal oxide particle. Upon contact, the $NO_x$ in the first gaseous input stream reacts with the metal oxide particle to generate nitrogen ($N_2$) gas and an oxidized metal oxide particle. Typically, contacting the first gaseous input stream with the metal oxide particle occurs at a first temperature of from 400° C. to 700° C. After contacting the first gaseous input stream with the metal oxide particle, a first gaseous product stream is collected. The first gaseous product stream includes substantially no $NO_x$. A second gaseous input stream comprising at least one sweeping gas is also contacted with the oxidized metal oxide particle, typically at a second temperature of from 600° C. to 1000° C. After contacting the oxidized metal oxide particle, the sweeping gas includes oxygen ($O_2$) and a reduced metal oxide particle is generated. The at least one sweeping gas provided to the system is oxygen ($O_2$) gas free. Then a second gaseous product stream is collected, where the second gaseous product stream includes oxygen ($O_2$) gas.

Other aspects of the disclosure will become apparent by consideration of the detailed description and accompanying drawings.

DETAILED DESCRIPTION

Figure 1A:
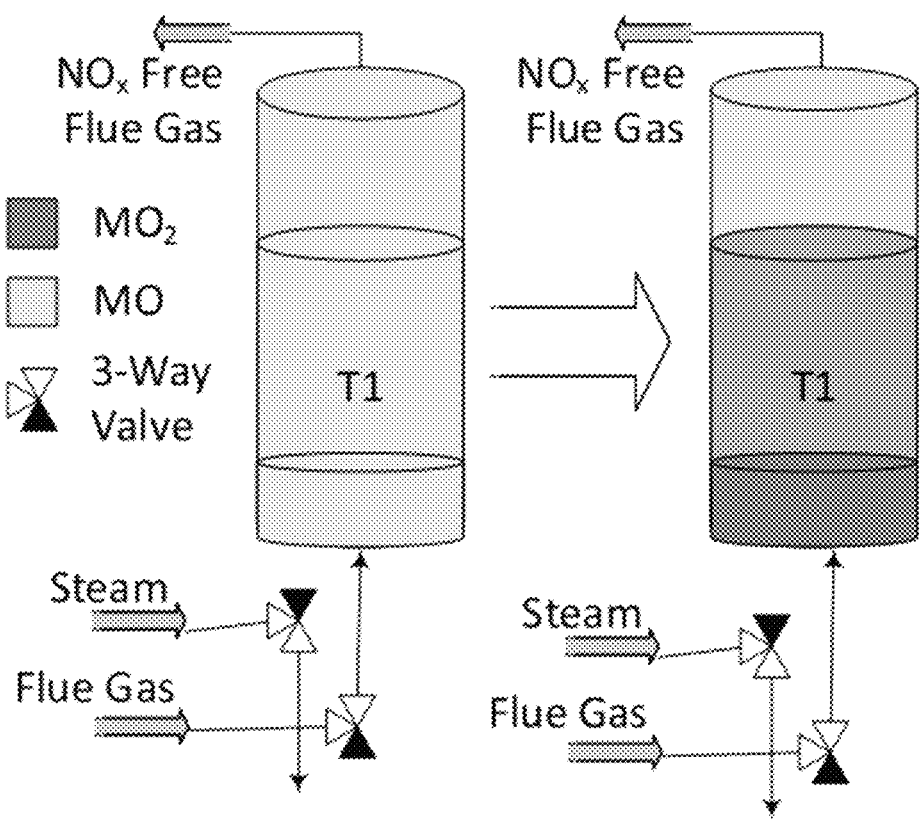
FIGS. 1A, 1B, and 1C show changes of state for a single fixed bed reactor system cycling between different stages of a $NO_x$ decomposition process using SOUMO material particles.

Systems and methods disclosed and contemplated herein relate to decomposition of $NO_x$. Disclosed systems and processes eliminate the use of a reducing gas and employ a regenerative solid phase reducing agent for NO decomposition. These regenerative solid phase reducing agents are termed as 'Specialized Oxygen Uncoupling Metal Oxides' or SOUMO. SOUMO material uptakes oxygen from $NO_x$ at a lower temperature, releasing $N_2$. Without the use of a reducing gas at a higher temperature, acquired oxygen acquired is then released because of the oxygen uncoupling tendency of the SOUMO. Exemplary systems can be implemented as, for instance, fixed bed, moving bed, and fluidized bed reactors. In various implementations, systems can be run in semi-batch or continuous modes.

Due to the regenerative characteristic of SOUMO, the system requires no additional chemical input making disclosed systems self-sustaining. As described in greater detail below, SOUMO material reacts selectively with the $NO_x$ in the flue gas and separates the product gases, $O_2$ and $N_2$, into two separate streams. This separation of products helps drive the reactions in a different manner than the catalytic processes.

Temperature ranges of operation for the NO decomposition reaction include 400-700° C. Temperature ranges of operation for $O_2$ uncoupling reaction include 600-1000° C. The system under these conditions achieves about, or equal to, 100% NO decomposition efficiency for a wide range of residence times.

Operating pressures for both reactors can individually range from 1atm to 30 atm based on the pressure of the NO containing feed stream. The separation of the product gases also helps in maximizing the driving force for individual reactions by changing the operating parameters independently for both the reactions. Example systems and methods exhibit almost, or equal to, 100% selectivity towards $N_2$. In other words, undesired by-products such as $NO_2$ and $N_2O$ are not formed.

Example systems and methods do not utilize a reducing gas, which in turn eliminates several auxiliary units, which can result in economic benefits for the chemical looping system over a commercial SCR system. Relatively inexpensive SOUMO materials can be used in the chemical looping mode (cost of material is <$1000/ton), which may be at least two orders of magnitude cheaper than materials required for conventional SCR systems.

The overall reaction of exemplary processes is similar to direct catalytic decomposition due to the regenerative nature of SOUMO materials. However, exemplary systems and methods utilize different reactors to perform different functions. Typically, example systems include an $NO_x$ decomposition reactor and an oxygen uncoupling reactor. The $NO_x$ decomposition reactor strips the oxygen atom from the NO molecule. The oxygen uncoupling reactor releases acquired oxygen into the gas phase. Both these functions are performed in the same reactor in conventional direct catalytic decomposition reaction systems.

The catalyst in the conventional direct decomposition process does not undergo any permanent reduction or oxidation under ideal operating conditions. In contrast, the active metal component(s) in the SOUMO material undergoes oxidation and reduction. For instance, in the $NO_x$ decomposition reactor, the oxidation state of the active metal component(s) in the SOUMO material increases due to the oxygen atoms being incorporated into the SOUMO material. In the oxygen uncoupling reactor, the oxidation state of the active metal component(s) in the SOUMO material reduces as the lattice oxygen is uncoupled into the gas phase. This change in oxidation state of the SOUMO material helps drive the $NO_x$ decomposition reaction at a lower temperature as compared to the direct catalytic $NO_x$ decomposition.

The design of systems and methods disclosed herein also adds degrees of freedom to the overall process, allowing for different solid compositions that work for this process. As mentioned above, disclosed and contemplated systems employ a chemical looping approach that decomposes $NO_x$ into its constituents ($N_2$ and $O_2$) in two separate streams. Traditionally, direct decomposition of $NO_x$ is carried out over a catalyst where both $N_2$ and $O_2$ exit the reactor in one stream. Thus, the catalytic system is always under a dynamic equilibrium between $NO_x$, the gas products and the catalyst surface. Hence, any additional $O_2$ in the reactant stream disrupts the equilibrium, reducing the $NO_x$ decomposition efficiency.

In the instantly disclosed systems and methods, because of the inherent separation of the two product streams, $NO_x$ decomposition efficiency is unaffected by the co-addition of $O_2$ in the chemical looping mode. This structure helps achieve high selectivity towards $N_2$ for $NO_x$ decomposition while maintaining high $NO_x$ decomposition activity. The separated $O_2$ stream is a value-added product that can be utilized. The $O_2$ stream in the instant systems and methods has the potential for reduction of parasitic power loads and boost in energy efficiency by reducing oxygen requirements from the air separation units. In contrast, in the catalytic direct decomposition system, an $O_2$ stream is emitted into the atmosphere; in the SCR system the $O_2$ stream is converted to $H_2O$.

The chemical looping mode reduces the decomposition temperature of $NO_x$ as compared to catalytic direct decomposition (typically ~700-900° C.) due to the reaction being aided by the phase change of the reduced SOUMO phase to the oxidized SOUMO phase. Additionally, the SOUMO material does not oxidize NO into $NO_2$, thus exemplifying the SOUMO material's selectivity towards $NO_x$ decomposition reaction. This structure illustrates a difference in reactivity and selectivity of the lattice oxygen available in the SOUMO particle as compared to molecular oxygen, either in gas phase or when adsorbed over a catalyst.

In contrast, the catalyst used in direct $NO_x$ decomposition suffers from $CO_2$ inhibition of the catalyst's active sites required for $NO_x$ decomposition. SOUMO materials used in exemplary systems and process are designed limit the loss of activity attributed to $CO_2$ inhibition to ~10%. This structure of the SOUMO materials displays an affinity towards $NO_x$ molecule more than the $CO_2$ molecule for adsorption on the metal oxide surface.

The direct catalytic decomposition process and the disclosed and contemplated systems and methods also differ in reaction pathways. Although both systems are driven by oxygen vacancies on the surface, the role and the nature of these vacancies are inherently different. In the direct catalytic decomposition process, the metal oxide surface maintains a constant amount of oxygen vacancies. The temperature of operation and the reactant composition are crucial for determining the concentration of these oxygen vacancies.

In the instantly disclosed and contemplated systems, the reduced SOUMO material stores the oxygen from $NO_x$ in its oxygen vacancy, depleting the concentration of oxygen vacancies on the surface with time. In other words, the reduced SOUMO material acts as a reactant rather than a catalyst, forming a stable intermediate species. The lattice oxygen thus formed undergoes diffusion into the bulk metal oxide, creating additional oxygen vacancies on the surface. When all the oxygen vacancies are exhausted, the oxidized SOUMO metal oxide is heated to yield molecular $O_2$ and generate new oxygen vacancies that are active towards $NO_x$ decomposition. Specifically, the oxidized SOUMO material that was the stable intermediate of the previous reaction, acts as a reactant, converting itself into the reduced SOUMO on reaction. Thus, the formation and depletion of oxygen vacancies occurs in two different reactors operating at two different conditions, leading to efficient removal of $NO_x$. The solid phase also inherently interacts with the gas reactants in a different fashion than the traditional catalytic process.

Example systems and methods can also be implemented as a series of fixed bed reactors. In those embodiments, the fixed bed reactors begin filled with a fully reduced SOUMO, MO. MO takes up oxygen from $NO_x$ from sources such as flue gas, converting it to $N_2$. This conversion of MO to $MO_2$ happens at a moderate temperature, where $MO_2$ does not undergo thermal oxygen uncoupling.

The outlet $NO_x$ concentration is continuously measured and when $NO_x$ begins to appear in the outlet stream, a three-way valve controlling the $NO_x$ source is switched such that the $NO_x$ flows to a fresh bed of MO, thus making this a continuous process. The oxidized bed, now filled with $MO_2$, is heated to the uncoupling temperature and an $O_2$-free sweeping gas, such as steam, is flowed over the bed to remove the oxygen as the SOUMO uncouples. Once the bed has completely uncoupled its oxygen, the reactor is cooled to the $NO_x$ uptake temperature and the sweeping gas is switched off. The bed is ready for another cycle of oxidation from $NO_x$.

Example Systems and Configurations

Figure 1B:
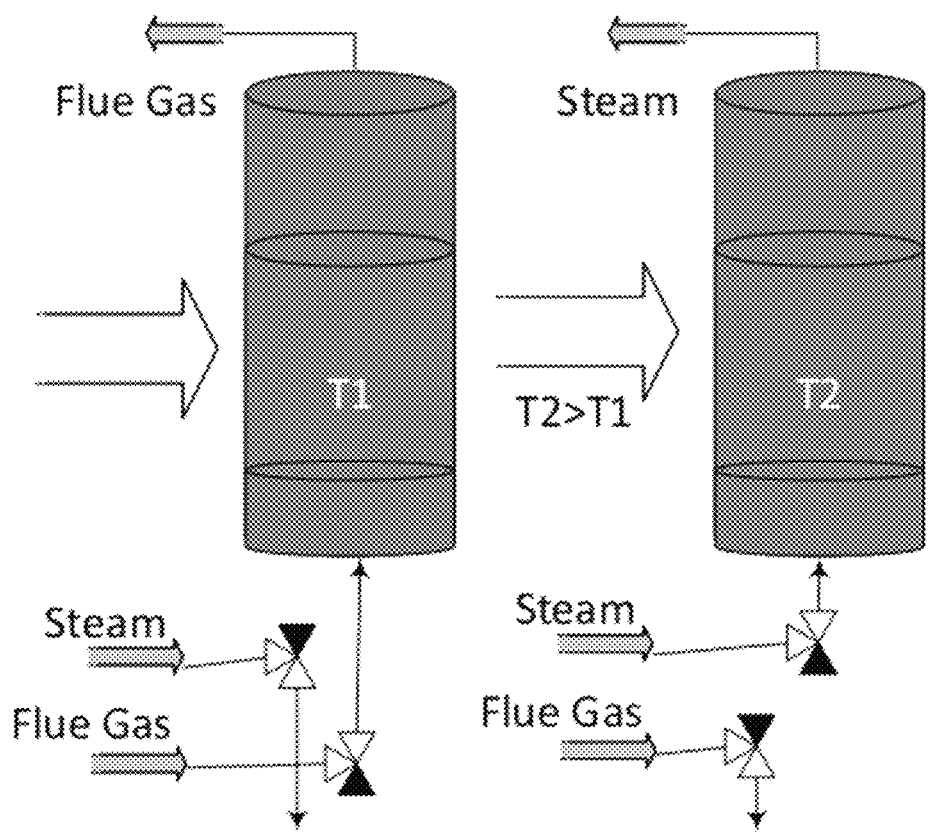
Figure 1C:
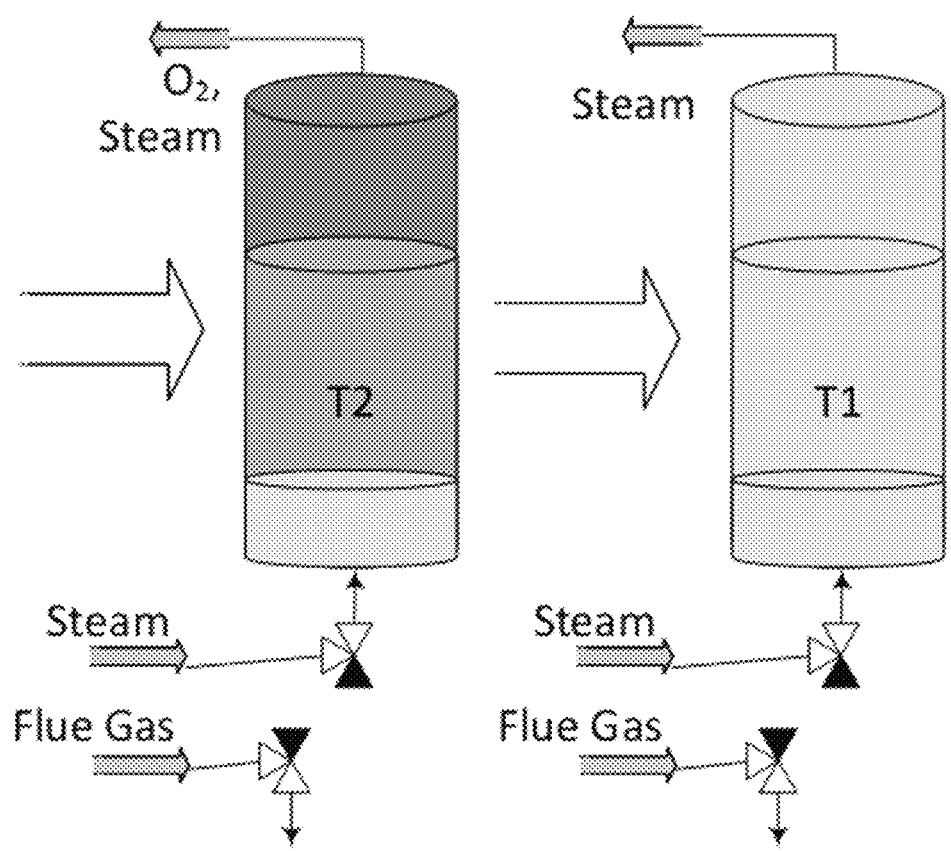

FIGS. 1A, 1B, and 1C show changes of state for a single fixed bed reactor system cycling between different stages of a $NO_x$ decomposition process using SOUMO material particles. More specifically, FIGS. 1A, 1B and 1C show the reduced metal oxide phase and the oxidized metal oxide phase with the corresponding changes in temperature, feed gas, and outlet gas. In practice, multiple fixed bed reactors could be used wherein one reactor is being fed flue gas while the other reactors are in various stages of regeneration.

The system can be optimized such that as soon as the breakthrough point of the reactor decomposing $NO_x$ is reached, another reactor is ready to begin decomposing $NO_x$. This system can be expanded to 'n' number of reactors of variable volume, such that there is SOUMO material ready to decompose $NO_x$.

In the stage shown in FIG. 1A, the bed is filled with reduced metal oxide particles and at lower temperatures, e.g., 400-700° C. Then $NO_x$ containing flue gas is injected into the bed. Thereafter, $NO_x$ in flue gas reacts in bed to produce a $NO_x$ free outlet gas and partially oxidized metal oxides ($NO_x$+Reduced Metal Oxide→$N_2$+Oxidized Metal oxide).

In the stage shown in FIG. 1B, based on the breakthrough times, injection of flue gas is stopped when $NO_x$ concentration in the outlet gas increases. As mentioned above, in certain configurations, there are multiple reactors in parallel so when one reactor stops flue gas injection, another starts. Then the bed of partially oxidized metal oxides is heated to an uncoupling temperature, which can be between 600-1000° C. Next, a sweeping gas, which is $O_2$-free, is injected over the bed.

In the stage shown in FIG. 1C, in the presence of elevated temperature and sweeping gas, SOUMO particles will release their oxygen into sweeping gas (Oxidized Metal Oxide→Reduced Metal Oxide+$O_2$). A separation step can separate the oxygen gas from the sweeping gas for a pure oxygen product. After the uncoupling process has completed (based on the time of reaction), injection of sweeping gas is stopped. Then, the reduced metal oxide particles are cooled to a lower temperature. The process can then return to the stage shown in FIG. 1A.

Figure 2:
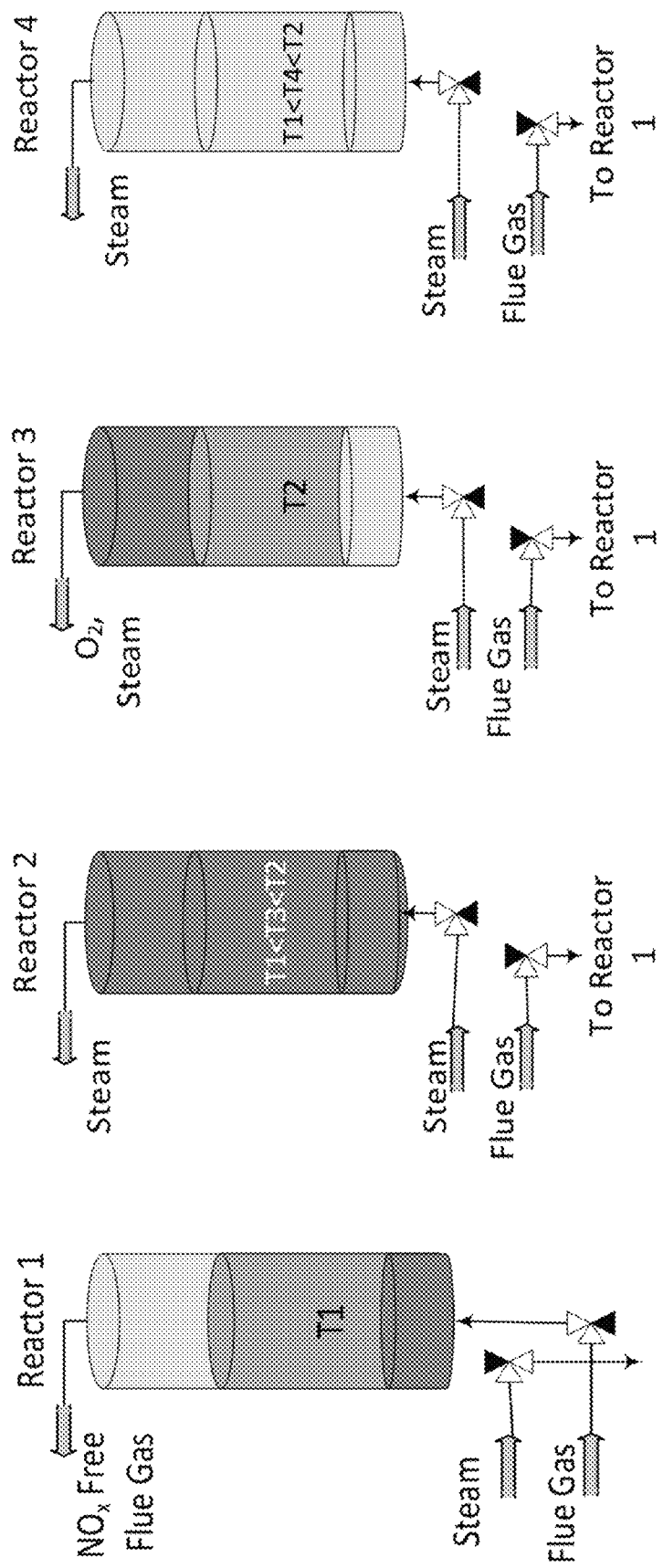
FIG. 2 shows an example of a process that has four fixed bed reactors operating in parallel and at different stages of the SOUMO $NO_x$ decomposition lifecycle.

FIG. 2 shows an example of a process that has four fixed bed reactors operating in parallel and at different stages of the SOUMO $NO_x$ decomposition lifecycle. The temperature range of operation for the $NO_x$ decomposition reaction is 400-700° C. and for $O_2$ uncoupling reaction is 600-1000° C. The operating pressure for both reactors can individually range from 1atm to 30 atm based on the pressure of the $NO_x$ containing feed stream.

Figure 3:
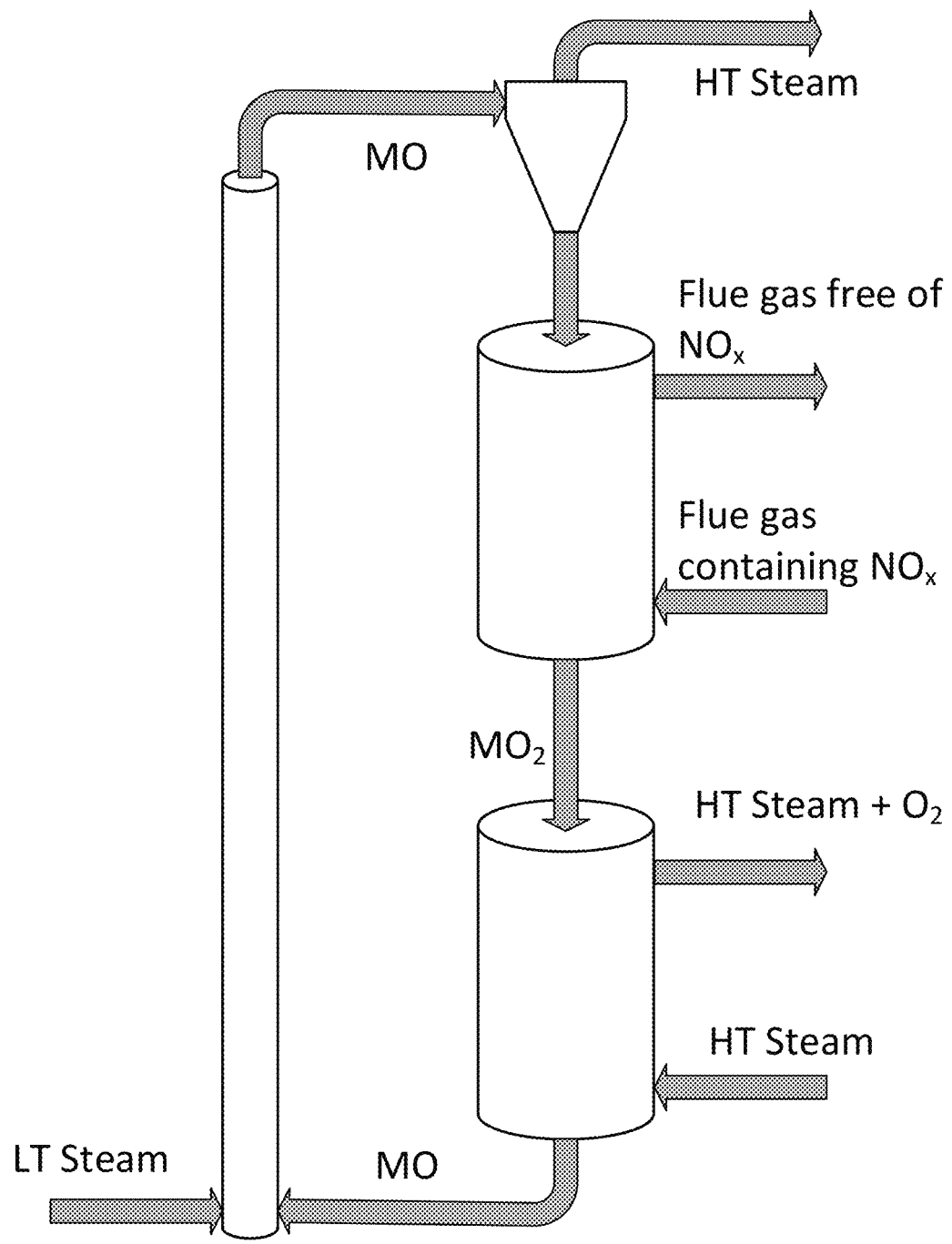
FIG. 3 shows a process flow diagram for a continuous $NO_x$ decomposition chemical looping system. LT and HT steam refer to low temperature and high temperature steam that act as a thermal cycling aid and as a $O_2$-free sweeping gas.

FIG. 3 shows a process flow diagram for a continuous $NO_x$ decomposition chemical looping system. MO and $MO_2$ are the reduced and the oxidized SOUMO particles respectively. The system shown in FIG. 3 includes moving/fluidized beds, where different reactors are operated under different gas compositions. In the circulating system shown in FIG. 3, typical operation begins by filling a bed with reduced metal oxide particles and at lower temperatures, e.g., 400-700° C. Then solids circulation is established with desired hourly space velocities. Next, $NO_x$ containing flue gas is injected into the NOx decomposition reactor.

$NO_x$ in the flue gas reacts in the NOx decomposition reactor to produce a $NO_x$ free outlet gas and partially oxidized metal oxides ($NO_x$+Reduced Metal Oxide→$N_2$+ Oxidized Metal oxide). The partially oxidized metal-oxide is sent to the $O_2$ uncoupling reactor, where in the temperature of the second reactor is maintained at between 600-1000° C. A sweeping gas (such as, for example, $H_2O$ or $N_2$) is continuously injected into the uncoupling reactor.

In the presence of elevated temperature and sweeping gas, metal oxides will release their oxygen into the sweeping gas (Oxidized Metal Oxide→Reduced Metal Oxide+$O_2$). A separation step can separate the oxygen gas from the sweeping gas for a pure oxygen product. After the uncoupling process has completed (based on the residence times), the metal-oxide is entrained to the NOx decomposition reactor wherein the particles are cooled to a lower temperature and the process can repeat.

Example SOUMO Material

The SOUMO particles can be synthesized by methods including but not limited to wet milling, extrusion, pelletizing, freeze granulation, co-precipitation, wet-impregnation, sol-gel and mechanical compression. Techniques, like sintering the synthesized SOUMO or adding a binder or a sacrificial agent with synthesis methods such as sol-gel combustion, can be used to increase the strength or the reactivity of the metal-oxide.

The SOUMO particles have an active metal oxide component with one or more reducible metal combined with or without, one or more dopant(s) to induce active sites and aid the formation of oxygen vacancies and with or without a support metal oxide component to enhance surface area and the distribution of the active sites. The reducible oxygen uncoupling metal oxides can be a combination of Co, Cu, Mn, Sr etc. which can be combined with other oxides of metals such as Ti, V, Cr, Fe, Ni, Zn, Ru, Rh, Ce, La, W etc. in the form of dopants, promoters or substituents. Dopants and promoters are in a smaller quantity (0-20 wt %) that do not change the original crystal structure. Substituents refer to components which can form one or several mixed metal oxide phase(s) with the active metal oxide, for example $CuCo_2O_4$ etc.

Figure 4:
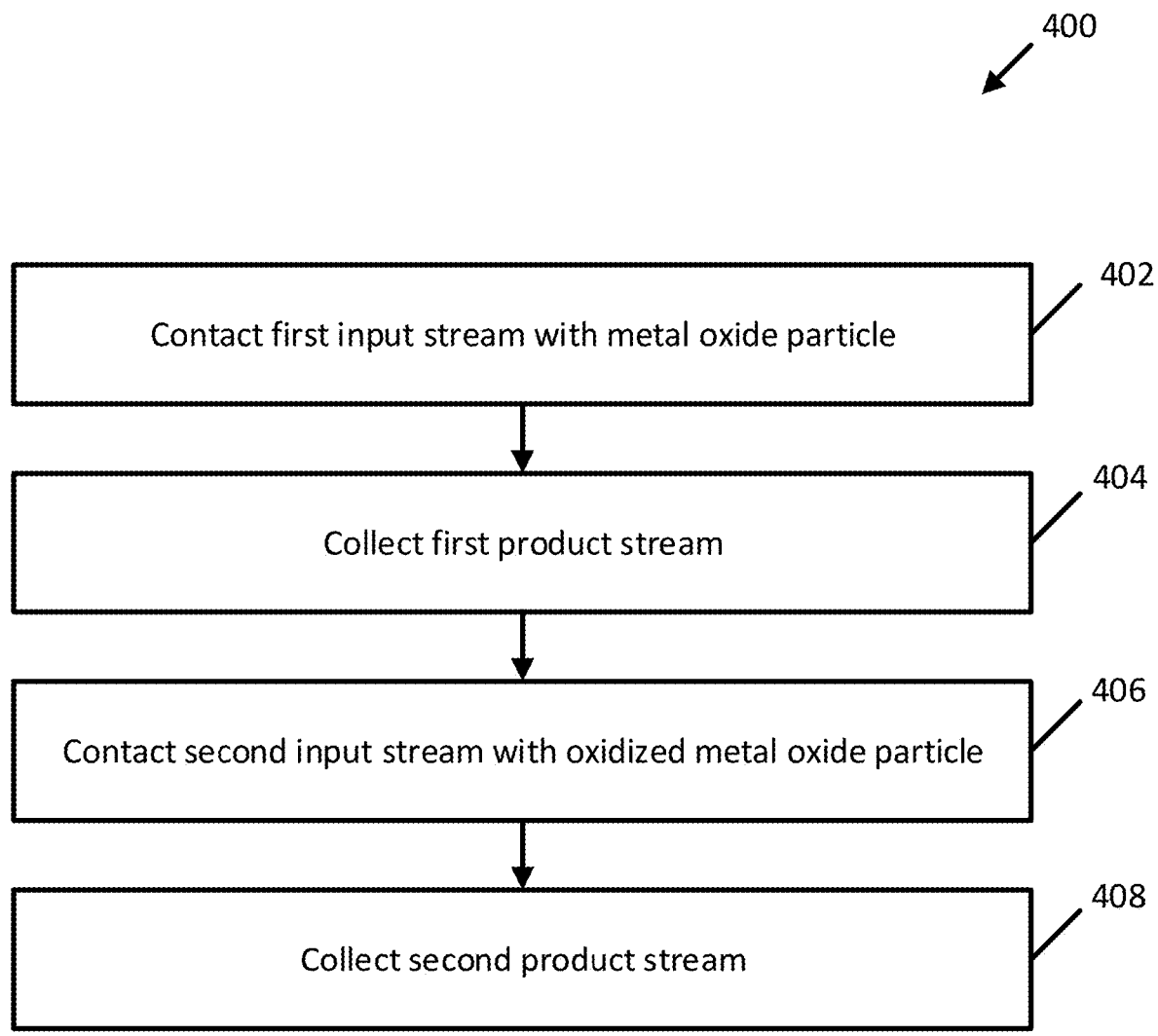
FIG. 4 shows an example method for $NO_x$ decomposition.

Quantities can range from stoichiometric ratios to make the mixed metal oxide, or in excess or lean quantities to get a mixture of the mixed metal oxide and the initial constituent (s). These reducible metals can be combined with oxides of group I and II metals such as Mg, Li, Na, Ca etc. to generate active sites when used as dopants or produce mixed metal oxides such as $Mg_6MnO_8$ or $CaMnO_3$. The support metal oxide includes but is not limited to metal oxides such as $SiO_2$, $Al_2O_3$, $ZrO_2$, $CeO_2$, $WO_3$ or mixed metal oxides such as $MgAl_2O_4$. The support material quantity can range from 10-90 wt % with the balance being the active SOUMO material. Typical surface areas of these metal oxide materials can range from 0.05-100 $m^2/g$ and can be manipulated by but not limited to changing the composition of the metal oxide itself, changing the operational conditions, changing the sintering conditions Example Methods of Operation FIG. 4 shows example method 400 for $NO_x$ decomposition. Method 400 can be implemented, for instance, in single fixed bed systems, multiple fixed bed systems, and continuous chemical looping systems. SOUMO material disclosed and contemplated herein can be used as metal oxide particles during implementation of method 400.

Example method 400 begins by contacting a first gaseous input stream comprising $NO_x$ with a metal oxide particle (operation 402). Upon contact, the $NO_x$ in the first gaseous input stream reacts with the metal oxide particle to generate nitrogen ($N_2$) gas and an oxidized metal oxide particle. Typically, contacting the first gaseous input stream with the metal oxide particle occurs at a first temperature of from 400° C. to 700° C.

After contacting the first gaseous input stream with the metal oxide particle (operation 402), a first gaseous product stream is collected (operation 404). The first gaseous product stream includes substantially no $NO_x$. In some instances, the first gaseous product stream includes less than 0.001% by volume $NO_x$.

A second gaseous input stream comprising at least one sweeping gas is also contacted with the oxidized metal oxide particle (operation 406). After contacting the oxidized metal oxide particle, the sweeping gas includes oxygen ($O_2$) and a reduced metal oxide particle is generated. Sweeping gas provided to the system is oxygen ($O_2$) gas free. Operation 406 typically occurs at a second temperature of from 600° C. to 1000° C. Then a second gaseous product stream is collected (operation 408), where the second gaseous product stream includes oxygen ($O_2$) gas.

In some instances, operation 402 occurs in a first reactor operating at the first temperature and operation 406 occurs in the first reactor operating at the second temperature. As one alternative, operation 402 can occurs in a first reactor operating at the first temperature and operation 406 occurs in a second reactor operating at the second temperature.

Method 400 can also include additional operations. For instance, method 400 can include monitoring $NO_x$ content in the first gaseous input stream and upon the $NO_x$ content exceeding a predetermined threshold, stopping contacting the first gaseous input stream with the metal oxide particle. Then, after stopping contacting the first gaseous input stream with the metal oxide particle, the reactor is heated to the second temperature. After heating the reactor to the second temperature, the second gaseous input stream is contacted with the oxidized metal oxide particle. After a predetermined time, contacting the second gaseous input stream with the oxidized metal oxide particle is stopped and the reactor temperature is lowered to the first temperature. In some instances, the reduced metal oxide particle is used as the metal oxide particle of operation 402.

Method 400 can also include providing the metal oxide particle to a first reactor, where contacting the first gaseous input stream with the metal oxide particle occurs in the first reactor operating at the first temperature. Collecting the first gaseous product stream includes providing a first reactor outlet stream substantially free of $NO_x$ gas. Then the oxidized metal oxide particle is provided to the second reactor. Contacting the second gaseous input stream with the oxidized metal oxide particle occurs in a second reactor operating at the second temperature. Collecting the second gaseous product stream includes providing a second reactor outlet stream comprising the oxygen ($O_2$) gas. Then, in some instances, the reduced metal oxide particle is used as the metal oxide particle provided to the first reactor.

EXPERIMENTAL EXAMPLES

SOUMO Screening for NOx Activity

Numerous composite metal oxides were initially considered based largely on their ability to thermally uncouple from oxygen. Metal oxides were initially tested in a Setsys Evolution thermo-gravimetric analyzer (TGA). The thermal uncoupling requirement led to most composites consisting at least partially of one of the typical chemical looping with oxidative uncoupling (CLOU) materials, including Mn, Cu and Co. Several showed the ability to uptake [O] from NO as demonstrated by a mass increase when the 5000 ppm NO reacted with the metal oxide. These metal oxides were screened for $NO_x$ decomposition reaction in the temperature range of 500° C. to 850° C. Correspondingly, the oxygen uncoupling reactions were carried out in the range of 800° C. to 1000° C.

This uptake-uncoupling cycle was carried out with a thermal swing, where the [O] uptake from NO was at the specified temperature and the $O_2$ uncoupling was done at 850° C. Ten such cycles were run for each of these variants to verify the recyclable nature of this process. The uptake is defined as μmoles of [O] taken up by the SOUMO per hour.

Two high performing classes of metal oxides were found, an Mn based particle and a Co based particle. The Mn based particle is $Mg_6MnO_8$ and the Co based particle is $CuCo_2O_4$. Both of these particles showed slightly different preferred temperatures, where the $Mg_6MnO_8$ particle achieved its best performance at 650° C. and the $CuCo_2O_4$ particle achieved its best performance at 550° C. The NO uptake versus temperature is shown in Table 1.

TABLE 1

NO uptake versus temperature between 500° C. and 700° C. for the Mn and Co based particles.

| | Oxygen Uptake (μmol O/hr) | |
|---|---|---|
| Temperature | $Mg_6MnO_8$ | $CuCo_2O_4$ |
| 500° C. | N/A | 14.192 |
| 550° C. | 5.279 | 16.522 |
| 600° C. | 6.959 | 14.247 |
| 650° C. | 6.562 | 9.539 |
| 700° C. | N/A | 7.148 |

Further attempts were made to enhance the particle performance including using dopants/promotors and supports to increase the surface area. The comparison of dopants/promotors and supports was done at the operating temperature that achieved the best performance for each class of metal oxide (550° C. for Co based particles and 650° C. for Mn based particles). For the Mn based particle, a lithium dopant and tungsten promoter were studied, along with an Mn—Cu mixed particle. The lithium dopant showed a slight decrease in performance while the tungsten promoter showed a slight increase. The Mn—Cu mixed oxide showed the best performance, about on par with that of the Co based material. These results are shown in Table 2.

TABLE 2

Effect of dopants and promotors on Mn based particles

| Particle | Oxygen Uptake (μmol O/hr) |
|---|---|
| Undoped $Mg_6MnO_8$ | 6.939 |
| Li doped $Mg_6MnO_8$ | 5.164 |
| W promoted $Mg_6MnO_8$ | 6.985 |
| CuO—W promoted $Mg_6MnO_8$ | 17.961 |

For the Co-based materials, three different supports were used to increase the surface area; tungsten oxide, zirconium oxide, and cerium oxide. Each support showed an increase in the oxygen uptake over the unsupported material. The cerium support showed the best performance and was able to increase the oxygen uptake by 75%. These results are shown in Table 3.

TABLE 3

Effect of supports on Co based particles

| Particle | Oxygen Uptake (μmol O/hr) |
|---|---|
| $CuCo_2O_4$ | 9.135 |
| $CuCo_2O_4/WO_3$ support | 9.476 |
| $CuCo_2O_4/ZrO_2$ support | 13.773 |
| $CuCo_2O_4/CeO_2$ support | 15.962 |

II. Resistance of SOUMO from Acid Gases:

$CO_2$ inhibition or poisoning is a problem in catalytic direct decomposition of $NO_x$, where the addition of $CO_2$ causes a reduction in the $NO_x$ conversion. SOUMO material can be tailored in such a way that the material shows a resistance to such an inhibition. The following is an example where $CO_2$ inhibition was tested for both the Co and Mn based SOUMO particles.

A ten cycle TGA test was run with ~5000 ppm NO and 15% $CO_2$ and compared to the results with only ~5000 ppm NO. The results of the test are shown in Table 4. The presence of 15% $CO_2$ does not show a significant reduction of oxygen uptake in either particle, for both particles there was less than a 10% reduction in oxygen uptake. Such a resistance towards $CO_2$ has not been observed in the literature for the catalysts that have been investigated.

TABLE 4

Effect of 15% $CO_2$ on NO uptake.

| Particle | Oxygen Uptake (μmol O/hr) 0% $CO_2$ | Oxygen Uptake (μmol O/hr) 15% $CO_2$ |
|---|---|---|
| $CuCo_2O_4$ @ 550° C. | 16.522 | 14.889 |
| W promoted $Mg_6MnO_8$ @ 650° C. | 6.986 | 6.452 |

II. Fixed Bed Test of SOUMO Materials

Figure 5:
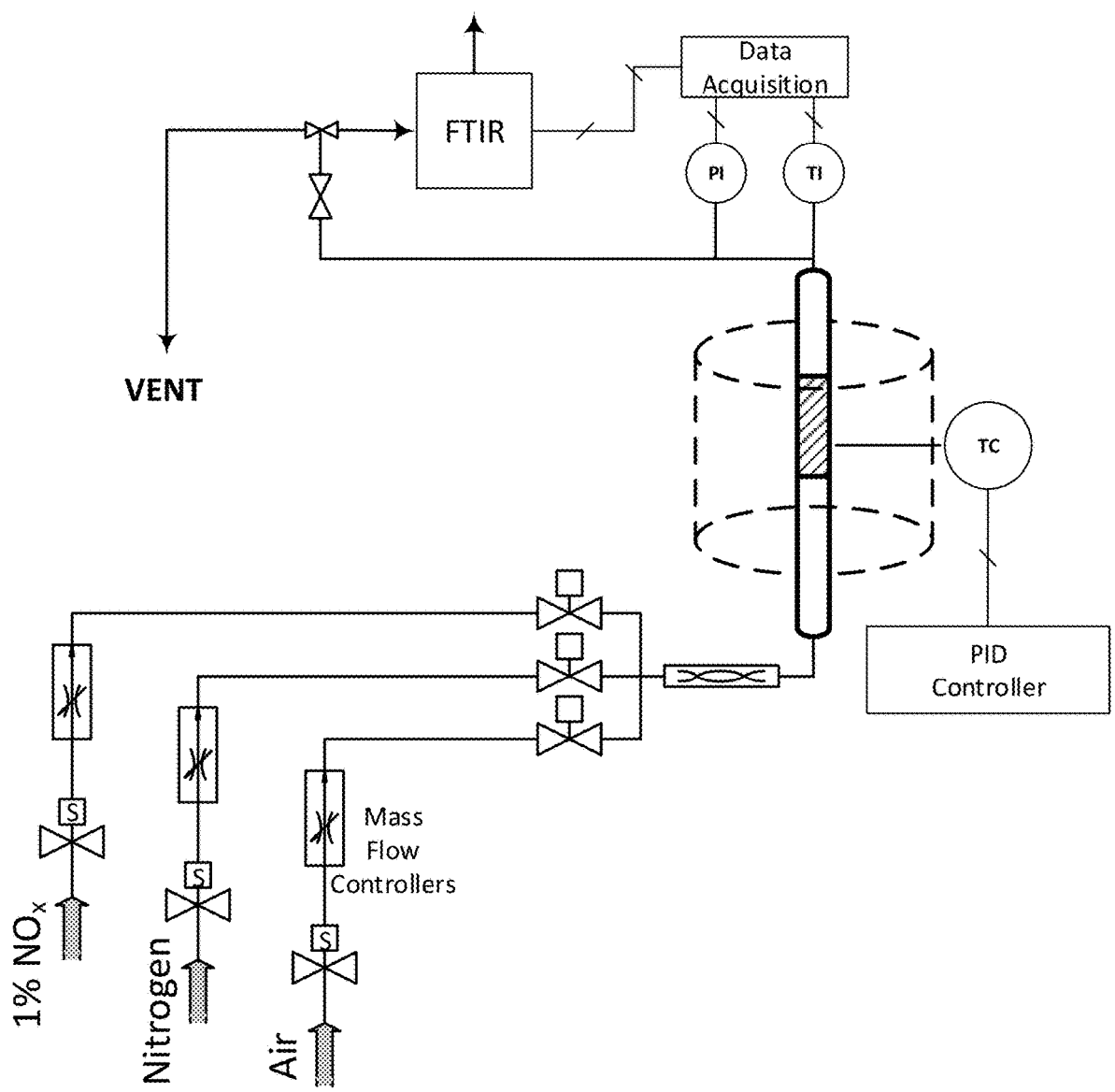
FIG. 5 is a schematic diagram for an experimental set-up for fixed bed trials.

Scaled-up fixed bed trials were run for further proof of concept. The residence time of the reactor was empirically estimated by running a blank run. The experimental set-up can be seen in FIG. 5. The NOx decomposition reaction and the oxygen uncoupling reaction was carried out in the same reactor by thermal cycling the bed. The following sections discuss the effect of oxygen co-addition, changing the gas hourly space velocity, and the effect of support on breakthrough times.

A. Effect of Oxygen Co-Addition

W promoted $Mg_6MnO_8$ was run in the fixed bed reactor at a GHSV of 1200 $hr^{-1}$ and a metal oxide to gas loading of 1.75 $gs/cm^3$. A trial with 500 ppm of NO with balance $N_2$ was run and compared to a trial with 500 ppm NO, 3% $O_2$ and balance $N_2$, both at a temperature of 650° C. The breakthrough time was compared against each other, to understand the effect of $O_2$ towards NO conversion.

Figure 6:
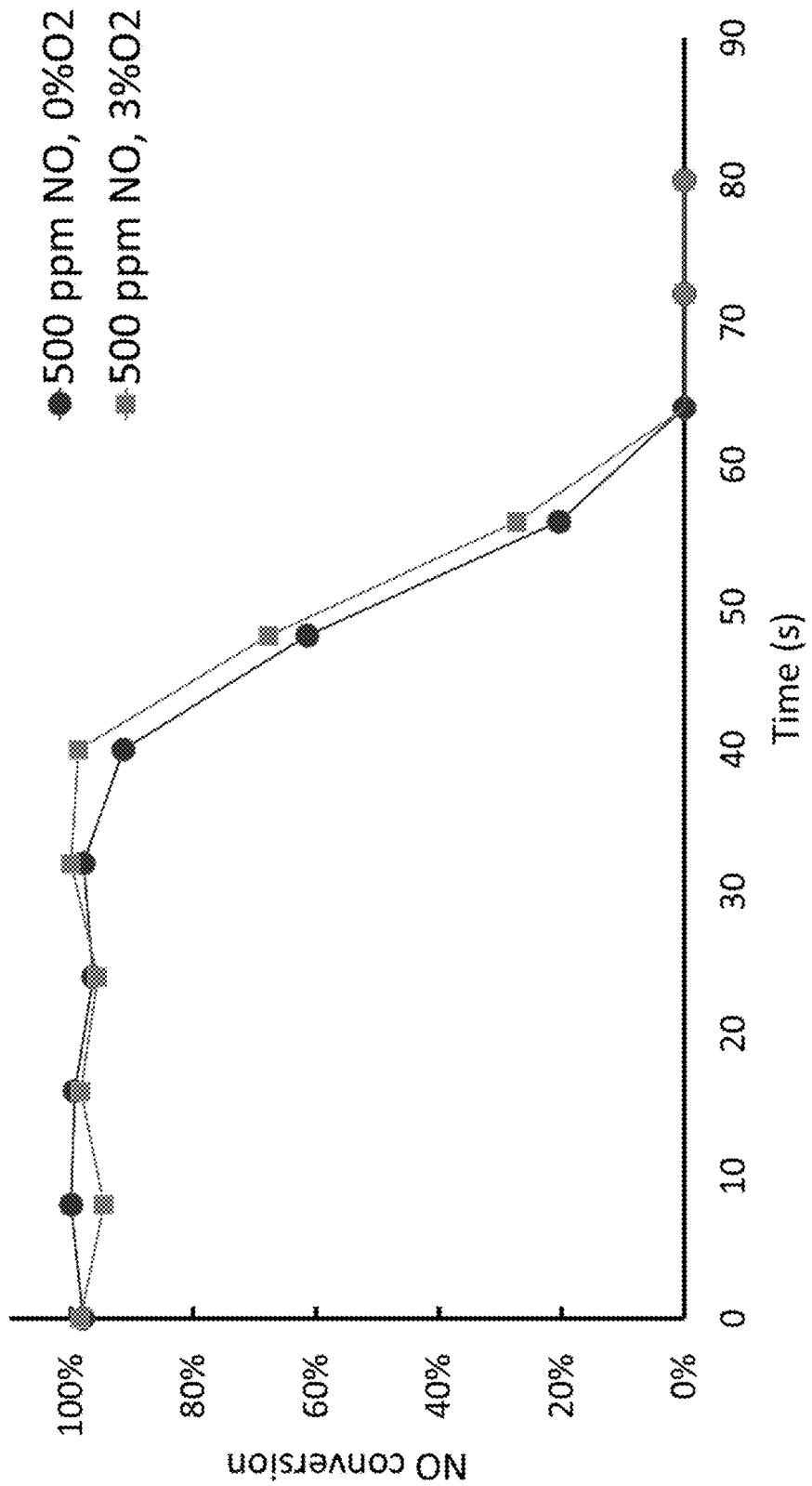
FIG. 6 shows breakthrough curves for W doped $Mg_6MnO_8$ in a fixed bed reactor for 0% and 3% $O_2$ provided with 500 ppm of NO at 650° C.

FIG. 6 shows the NO conversion with time for both the trials after accounting for the residence time. As illustrated, the breakthrough time for both these trials approximately is the same, suggesting a preferential reaction favoring the decomposition of NO. Thus, SOUMO material can be customized to exhibit a high selectivity towards oxygen uptake from NO as compared to oxygen uptake from $O_2$. In this example, the breakthrough time for both the trials was 40 seconds, during which the NO conversion was ~99%. Also, during the [O] uptake from NO, $N_2O$ and $NO_2$ were not detected, highlighting the absence of secondary undesired reactions in this system.

B. Changing the Gas Hourly Space Velocity

Figure 7:
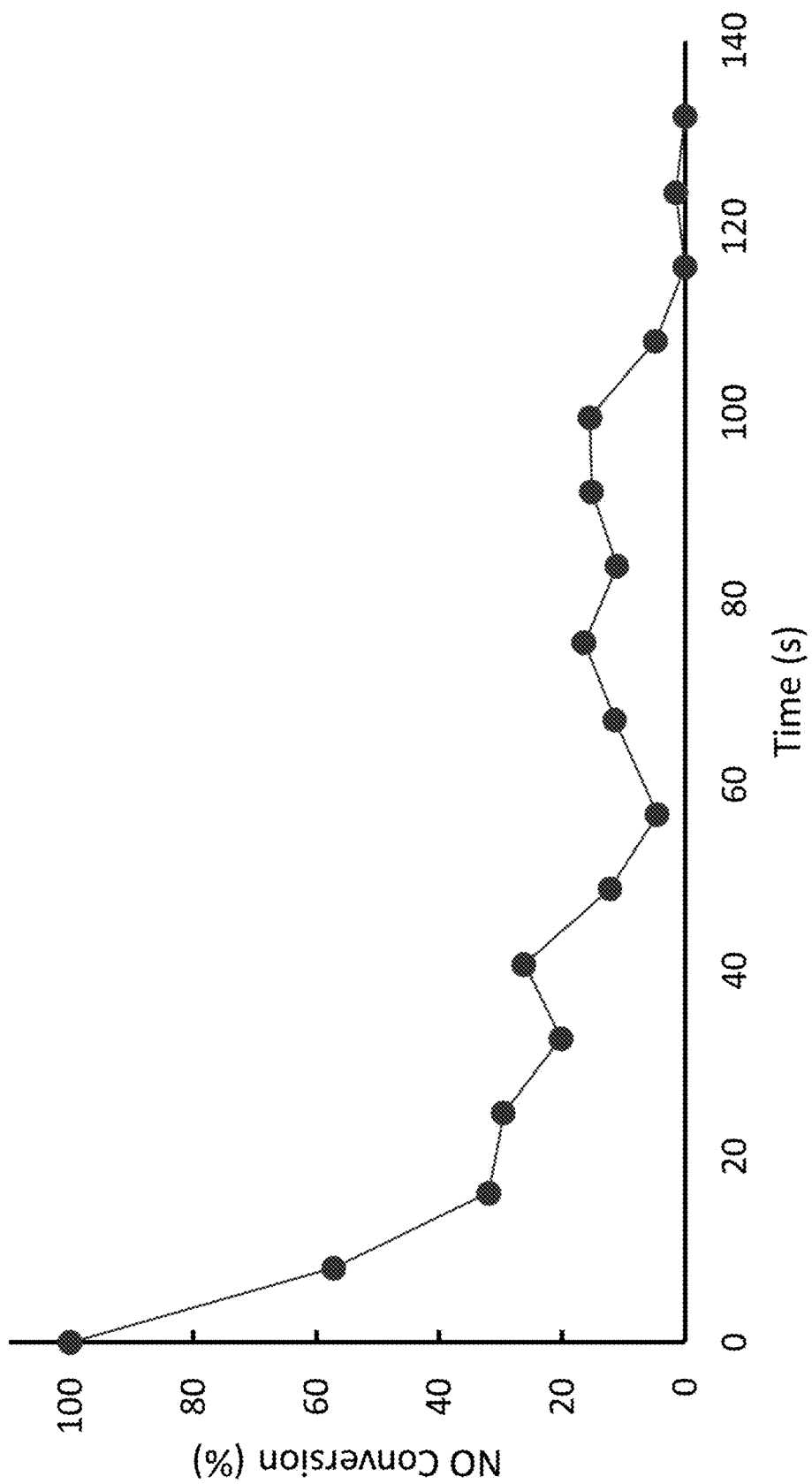
FIG. 7 shows a breakthrough curve for unsupported $CuCo_2O_4$ in a fixed bed reactor with 500 ppm of NO feed at 550° C.

Unsupported $CuCo_2O_4$ was run at 4 $gs/cm^3$ to probe the change in the breakthrough curve of $NO_x$ coming out of the reactor. The reactor was operated at 550° C., with oxygen uncoupling carried out at 850° C. Similar to the previous fixed bed experiment, the $NO_x$ concentration was 500 ppm with balance as $N_2$. FIG. 7 shows data for $NO_x$ decomposition with time. The lower surface area of this SOUMO material encourages curve gas bypassing thus elongating the breakthrough curve to up to 120 s.

Figure 8:
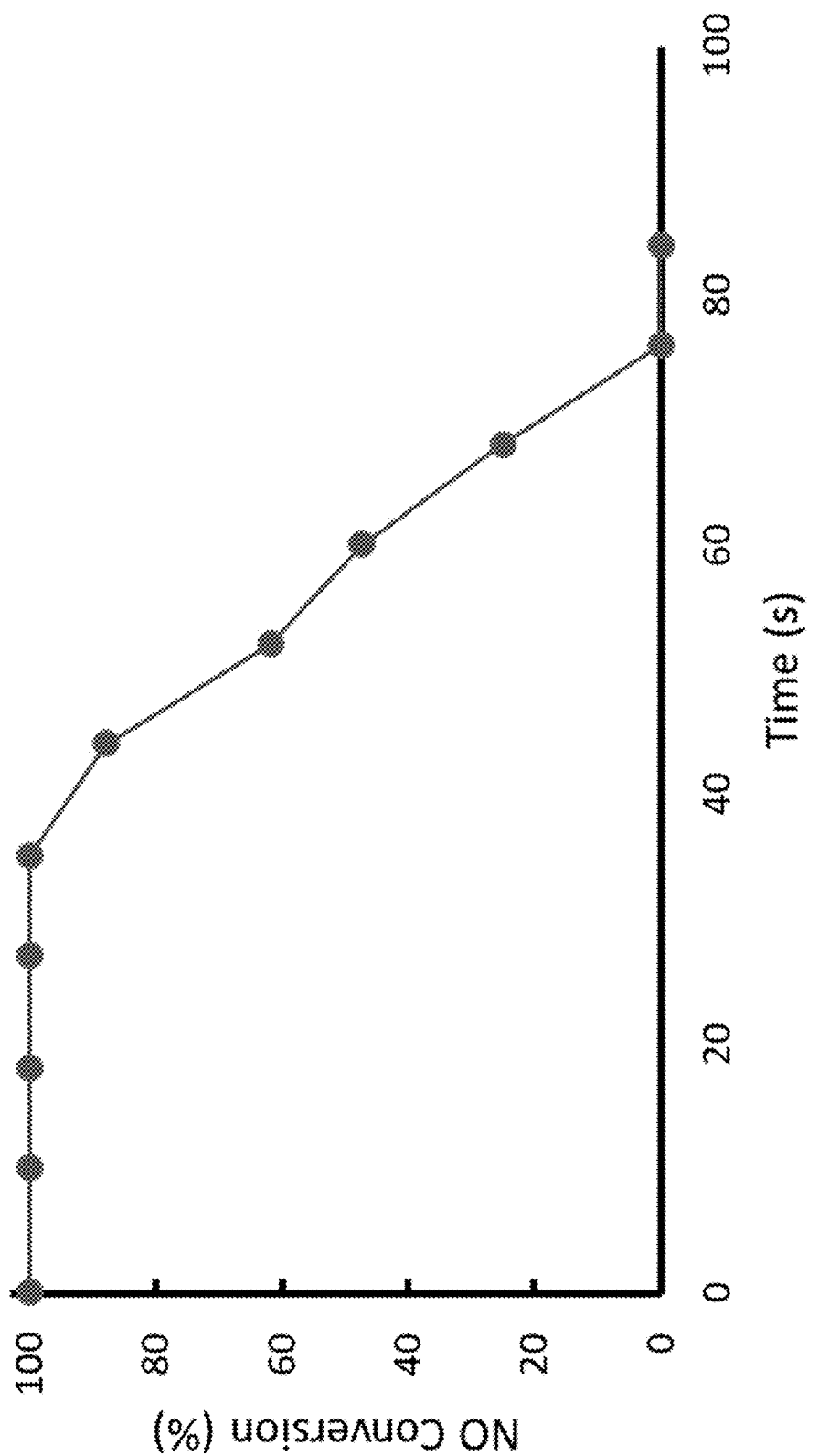
FIG. 8 shows a breakthrough curve for $CuCo_2O_4/CeO_2$ in a fixed bed reactor with 500 ppm of NO feed at 550° C.

C. Effect of Support on Breakthrough Times $CuCo_2O_4$ SOUMO material depicts higher oxygen uptake when $CeO_2$ was used as a support, as seen in Table 3, above. The $CeO_2$ supported $CuCo_2O_4$ SOUMO material was tested in the fixed bed reactor at 550° C., with oxygen uncoupling carried out at 850° C. The $CeO_2$ supported $CuCo_2O_4$ SOUMO material was run at 1.85 $gs/cm^3$, with 500 ppm $NO_x$ as the reactant feed. FIG. 8 shows the breakthrough curve for both these configurations. The plateau region is similar to the W promoted $Mg_6MnO_8$ breakthrough curve in FIG. 6 lasting for 35 s. The difference in behavior from FIG. 7 results from the increase in surface area due to the addition of the support.

Unless otherwise defined, all technical and scientific terms used herein have the same meaning as commonly understood by one of ordinary skill in the art. In case of conflict, the present document, including definitions, will control. Example methods and materials are described below, although methods and materials similar or equivalent to those described herein can be used in practice or testing of the present disclosure. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

Definitions of specific functional groups and chemical terms are described in more detail below. For purposes of this disclosure, the chemical elements are identified in accordance with the Periodic Table of the Elements, CAS version, Handbook of Chemistry and Physics, 75$^{th}$ Ed., inside cover, and specific functional groups are generally defined as described therein. For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated. For example, when a pressure range is described as being between ambient pressure and another pressure, a pressure that is ambient pressure is expressly contemplated.

We claim:

1. A method comprising:
    contacting a first gaseous input stream comprising $NO_x$ with a metal oxide particle, whereupon the $NO_x$ in the first gaseous input stream reacts with the metal oxide particle to generate nitrogen ($N_2$) gas and an oxidized metal oxide particle,
        wherein contacting the first gaseous input stream with the metal oxide particle occurs at a first temperature of from 400° C. to 700° C.;
    collecting a first gaseous product stream comprising substantially no $NO_x$;
    contacting a second gaseous input stream comprising at least one sweeping gas with the oxidized metal oxide particle, whereupon the sweeping gas comprises oxygen ($O_2$) gas after contacting the oxidized metal oxide particle and a reduced metal oxide particle is generated,
        wherein the at least one sweeping gas is oxygen ($O_2$) gas free;
        wherein contacting the second gaseous input stream with the oxidized metal oxide particle occurs at a second temperature of from 600° C. to 1000° C.; and
    collecting a second gaseous product stream comprising the oxygen ($O_2$) gas.

2. The method according to claim 1, wherein contacting the first gaseous input stream with the metal oxide particle occurs in a first reactor operating at the first temperature; and
    wherein contacting the second gaseous input stream with the oxidized metal oxide particle occurs in the first reactor operating at the second temperature.

3. The method according to claim 2, further comprising:
    monitoring $NO_x$ content in the first gaseous input stream;
    upon the $NO_x$ content exceeding a predetermined threshold, stopping contacting the first gaseous input stream with the metal oxide particle;
    after stopping contacting the first gaseous input stream with the metal oxide particle, heating the first reactor to the second temperature;
    after heating the first reactor to the second temperature, contacting the second gaseous input stream with the oxidized metal oxide particle;

after a predetermined time, stopping contacting the second gaseous input stream with the oxidized metal oxide particle; and lowering a first reactor temperature to the first temperature.

4. The method according to claim 3, further comprising using the reduced metal oxide particle as the metal oxide particle during contacting the first gaseous input stream with the metal oxide particle.

5. The method according to claim 1, further comprising:
providing the metal oxide particle to the first reactor,
    wherein contacting the first gaseous input stream with the metal oxide particle occurs in the first reactor operating at the first temperature; and
    wherein collecting the first gaseous product stream includes providing a first reactor outlet stream substantially free of $NO_x$ gas; and
providing the oxidized metal oxide particle to the second reactor,
    wherein contacting the second gaseous input stream with the oxidized metal oxide particle occurs in a second reactor operating at the second temperature; and
    wherein collecting the second gaseous product stream includes providing a second reactor outlet stream comprising the oxygen ($O_2$) gas.

6. The method according to claim 5, further comprising using the reduced metal oxide particle as the metal oxide particle provided to the first reactor.

7. The method according to claim 1, wherein the first gaseous product stream includes less than 0.001% by volume $NO_x$.

* * * * *